(12) United States Patent
Takeda et al.

(10) Patent No.: US 10,455,571 B2
(45) Date of Patent: Oct. 22, 2019

(54) TERMINAL DEVICE, BASE STATION DEVICE, AND COMMUNICATION METHOD

(71) Applicant: Sun Patent Trust, New York, NY (US)

(72) Inventors: Kazuki Takeda, Kanagawa (JP); Akihiko Nishio, Osaka (JP); Daichi Imamura, Beijing (CN); Yoshihiko Ogawa, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

(21) Appl. No.: 15/874,201

(22) Filed: Jan. 18, 2018

(65) Prior Publication Data

US 2018/0146459 A1 May 24, 2018

Related U.S. Application Data

(63) Continuation of application No. 14/006,642, filed as application No. PCT/JP2013/000162 on Jan. 16, 2013, now Pat. No. 9,913,260.

(30) Foreign Application Priority Data

Jan. 30, 2012 (JP) .................................. 2012-016414

(51) Int. Cl.
*H04W 72/04* (2009.01)
*H04J 13/16* (2011.01)
(Continued)

(52) U.S. Cl.
CPC ......... *H04W 72/042* (2013.01); *H04J 11/005* (2013.01); *H04J 13/16* (2013.01);
(Continued)

(58) Field of Classification Search
CPC ..... H04J 11/005; H04J 13/16; H04L 27/2613; H04L 5/0032; H04W 24/02; H04W 72/042; H04W 72/0466
See application file for complete search history.

(56) References Cited

U.S. PATENT DOCUMENTS 8,588,168 B2 11/2013 Qu et al.
2009/0047955 A1 2/2009 Frenger et al.
(Continued)

FOREIGN PATENT DOCUMENTS

EP 2 187 678 A1 5/2010
WO 2011/120584 A1 10/2011

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release •10)," Dec. 2011, 101 pages.

(Continued)

*Primary Examiner* — Jason E Mattis
*Assistant Examiner* — Nizam U Ahmed
(74) *Attorney, Agent, or Firm* — Seed IP Law Group LLP

(57) ABSTRACT

A terminal device is equipped with: a sequence determination unit that determines a sequence number with a different pattern than the assignment pattern for the sequence number assigned to the cell in which the host device resides; a reference signal generation unit that generates a reference signal for a sequence group corresponding to the sequence number that has been determined; and a wireless transmission unit that transmits the reference signal that has been generated to a base station. The sequence determination unit employs a configuration whereby, with the sequence number assigned to the cell in which the host device resides as a cell-specific sequence number, a dynamic offset which periodically changes over time and for which the same value is not consecutive is added to the cell-specific sequence number, thereby determining a sequence number which never overlaps with the cell-specific sequence number.

20 Claims, 17 Drawing Sheets

(51) Int. Cl.
  *H04L 5/00*    (2006.01)
  *H04W 24/02*   (2009.01)
  *H04J 11/00*   (2006.01)
  *H04L 27/26*   (2006.01)

(52) U.S. Cl.
  CPC ........ *H04L 5/0032* (2013.01); *H04L 27/2613* (2013.01); *H04W 24/02* (2013.01); *H04W 72/0466* (2013.01)

(56) References Cited

U.S. PATENT DOCUMENTS

| | | | |
|---|---|---|---|
| 2010/0034312 | A1 | 2/2010 | Muharemovic et al. |
| 2013/0010833 | A1* | 1/2013 | Ogawa ................. H04J 11/0023 375/138 |
| 2013/0039285 | A1 | 2/2013 | Sorrentino |
| 2013/0039387 | A1* | 2/2013 | Qu ........................ H04L 5/0051 375/141 |
| 2013/0072241 | A1 | 3/2013 | Sorrentino |
| 2013/0201931 | A1* | 8/2013 | Noh .................... H04L 27/2613 370/329 |

OTHER PUBLICATIONS

3GPP TS 36.212 V10.4.0, "3rd Generation Partnership Project; Technical Specification Group Radio Access Network; Evolved Universal Terrestrial Radio Access (E-UTRA); Multiplexing and channel coding (Release 10)," Dec. 2011, 79 pages.

3GPP TS 36.213 V10.4.0, "3rd Generation Partnership Project; Technical Specification Group Radio Access Network; Evolved Universal Terrestrial Radio Access (E-UTRA); Physical layer procedures (Release 10)," Dec. 2011, 125 pages.

CATT, "Considerations on UL RS enhancement for CoMP transmission," R1-113735, 3GPP TSG RAN WG1 Meeting #67, Agenda Item: 7.5.4.1, San Francisco, USA, Nov. 14-18, 2011, 3 pages.

Extended European Search Report dated Jul. 16, 2015, for corresponding EP Application No. 13744118.4-1851 / 2811802, 9 pages.

International Search Report dated Feb. 19, 2013, for corresponding International Application No. PCT/JP2013/000162, 3 pages.

New Postcom, "Uplink reference signals for uplink CoMP," R1-113693, 3GPP TSG RAN WG1 Meeting #67, Agenda Item: 7.5.4.1, San Francisco, USA, Nov. 14-18, 2011, 6 pages.

Panasonic, "DMRS enhancement for UL CoMP," R1-113810, 3GPP TSG RAN WG1 Meeting #67, Agenda Item: 7.5.4.1, San Francisco, USA, Nov. 14-18, 2011, 6 pages.

Panasonic, "UE-specific base sequence assignment for UL CoMP," R1-120229, 3GPP TSG-RAN WG1 Meeting #68, Agenda Item: 7.5.6.1.1, Dresden, Germany, Feb. 6-10, 2012, 5 pages.

\* cited by examiner

FIG. 14

EACH USED SEQUENCE OVERLAPS TWICE IN $N_{CELL\_ID}$ = 1, 3, 5, 7, 9, AND OVERLAPS ONCE IN $N_{CELL\_ID}$ = 11, 13, 15, 17, ..., 29 ($\lambda$ = 2, z = 1)

EACH USED SEQUENCE OVERLAPS ONCE UNTIL $N_{CELL\_ID}$ = 20 ($\lambda$ = 1, z = 1)

| $N_{cell\_ID}$=5 | 17 | 9 | 29 | 22 | 5 | 22 | 32 | 23 | 24 |
| --- | --- | --- | --- | --- | --- | --- | --- | --- | --- |
| $N_{cell\_ID}$=4 | 16 | 8 | 28 | 21 | 4 | 21 | 31 | 22 | 23 |
| $N_{cell\_ID}$=3 | 15 | 7 | 27 | 20 | 3 | 20 | 30 | 21 | 22 |
| $N_{cell\_ID}$=2 | 14 | 6 | 26 | 19 | 2 | 19 | 29 | 20 | 21 |
| $N_{cell\_ID}$=1 | 13 | 5 | 25 | 18 | 1 | 18 | 28 | 19 | 20 |
| Hopping pattern of $N_{cell\_ID}$=0 | 12 | 4 | 24 | 17 | 0 | 17 | 27 | 18 | 19 |

Time slot, ns →

TERMINAL DEVICE, BASE STATION DEVICE, AND COMMUNICATION METHOD

BACKGROUND

Technical Field

The present invention relates to a terminal apparatus, a base station apparatus, and a communication method each used for transmitting a reference signal.

Description of the Related Art

LTE (Long Term Evolution) Rel. 8 (Release 8) developed in 3GPP (3rd Generation Partnership Project Radio Access Network) employs SC-FDMA (single-carrier frequency-division multiple-access) involving a low PAPR (peak-to-average power ratio) and high electric-power use efficiency of a terminal apparatus (also referred to as UE) as an uplink communication scheme (refer to Non-Patent Literatures (hereinafter, abbreviated as NPLs) 1, 2, and 3).

In the uplink of LTE, both a data signal of PUSCH (Physical Uplink Shared Channel) and a control signal of a PUCCH (Physical Uplink Control Channel) are transmitted on a per-subframe basis (refer to NPL 1).

Each subframe includes two time slots. In each time slot, a plurality of SC-FDMA symbols and a DMRS (demodulation reference signal, also abbreviated as DRS) as one of the reference signals are time-multiplexed. FIG. 1 illustrates an example of a subframe configuration of a PUSCH to which normal cyclic prefix is applied.

Upon reception of a data signal on the PUSCH, the base station performs channel estimation using a DMRS. The result of channel estimation result is used to demodulate and decode an SC-FDMA symbol. In addition, in LTE-A (LTE-Advanced) Rel. 10 (Release 10), DFTS-OFDM (discrete-Fourier-transform spread orthogonal frequency division multiplexing), which is an extended version of SC-FDMA, has also become available. This is a method of dividing into two spectra the data signals of the PUSCH obtained as illustrated in FIG. 1, and mapping the divided signals to different frequencies, and thereby expanding the flexibility of scheduling without any change in the configuration of the PUSCH from that of SC-FDMA.

On the other hand, the control signal of PUCCH has a plurality of formats each having a subframe configuration different from that of PUSCH (refer to NPL 1). Any one of the formats involves a subframe consisting of two slots, and each slot includes a plurality of SC-FDMA symbols and a plurality of DMRSs. The control signal of PUCCH is demodulated on the basis of a channel estimation result using the DMRS similarly to the data signal of PUSCH.

In order to correctly decode information transmitted on the PUSCH and PUCCH, highly precise channel estimation by the DMRS is indispensable. In Rel. 10 of LTE-A, the DMRSs of different UEs connected to the single cell are transmitted while different cyclic shifts (CSs, equivalent to phase rotations) or orthogonal codes (also referred to as orthogonal cover codes (OCCs)) are allocated to the DMRSs. Accordingly, these DMRSs can be orthogonally multiplexed and orthogonally demultiplexed.

On the other hand, the DMRSs transmitted by different UEs connected to different cells cannot be demultiplexed. Therefore, in order to suppress inter-cell interference and to perform highly precise channel estimation, it is necessary to use different signal sequences having a small correlation between different cells.

Consequently, in Rel. 8-10 of LTE-A, 30 different base sequence groups mutually having low correlations are defined and are respectively allocated to cells. Moreover, in order to avoid causing uneven magnitude of interference, sequence group hopping that changes the sequence group used for every time slot is introduced.

The base sequence group refers to a group including a plurality of base sequences having a plurality of sequence lengths. Moreover, the sequence group refers to a group obtained by gathering a plurality of signal sequences obtained by cyclically shifting all the respective base sequences in one base sequence group. Therefore, allocating a base sequence group to a cell means the same as allocating a sequence group corresponding to the base sequence group to the cell.

FIG. 2 illustrates the feature of a sequence group allocated to each cell.

For example, when $N_{cell\ ID}$ represents a cell-specific identifier ID (cell ID number), a sequence group corresponding to a number given by the following expression is allocated in an $n_s$-th slot in the cell.

[1]

$$u = (f_{gh}(n_s) + f_{ss}) \bmod 30, \quad n_s = 0 \sim 19 \qquad \text{(Expression 1)}$$

In expression 1, $f_{gh}(n_s)$ is a hopping pattern represented with a sequence group determined by a PN (pseudo-random) sequence having an initial value equal to an integer value obtained by truncating $N_{cell\ ID}/30$ after the decimal point, and $N_{cell\ ID}$ is given by an integer of 0 to 503.

Offset $f_{ss}$ is an integer determined by the following expression, and is provided to each cell.

[2]

$$f_{ss} = \begin{cases} N_{cellID} \bmod 30 & \text{for } PUCCH \\ N_{cellID} + \Delta_{ss} \bmod 30 & \text{for } PUSCH \end{cases} \qquad \text{(Expression 2)}$$

In expression 2, $\Delta_{ss}$ is one of the integers of 0 to 29 and is indicated to a UE as a cell-specific parameter. The sequence group hopping can also be disabled (that is, setting $f_{gh}(n_s)=0$) on a per-cell basis or on a per-UE basis.

The following is found from the above.

1. In many cells included in a system, according to 504 pieces of different $N_{cell\ ID}$, 30 sequence groups are repeatedly used in different cells.

2. A sequence hopping pattern ($f_{gh}(n_s)$) is the same among 30 cells having continuous $N_{cell\ ID}$, and the hopping patterns of sequence groups are different between the cells having an interval of $N_{cell\ ID}$ equal to or more than 30. A cell group with the same hopping pattern ($f_{gh}(n_s)$) constitutes a cell cluster.

3. In one cell cluster, offset $f_{ss}$ varies from cell to cell in principle. In other words, this is equal to using patterns obtained by applying cell-specific sequence offset $f_{ss}$ to a common sequence group hopping pattern.

FIG. 3 illustrates an example of sequence group hopping. FIG. 3 illustrates hopping patterns of a sequence group used in a cell cluster including $N_{cell\ ID}=0$ to 29. For the sake of simplicity, it is assumed that $\Delta_{ss}=0$ in all cells.

As illustrated in FIG. 3, a hopping pattern is common in one cell cluster, but a different sequence offset is given according to the value of $N_{cell\ ID}$. Therefore, in a cell cluster, a different sequence group is always used in a different cell. Moreover, hopping patterns themselves differ in different cell clusters. Therefore, in cells in different cell clusters, even if sequence groups overlap, causing an increase in interference, the interference does not continue over a plurality of slots.

The base sequence group allocated to each cell in this way is used, for example, for an uplink SRS (sounding reference signal) that is one of the reference signals and modulation of a PUCCH in addition to the DMRS.

CITATION LIST

Non-Patent Literatures

NPL 1
3GPP TS 36.211 V10.4.0, "Physical Channels and Modulation (Release 10)," December 2011
NPL 2
3GPP TS 36.212 V10.4.0, "Multiplexing and channel coding (Release 10)," December 2011
NPL 3
3GPP TS 36.213 V10.4.0, "Physical layer procedures (Release 10)," December 2011

BRIEF SUMMARY

Technical Problem

CoMP reception (coordinated multipoint reception) has been discussed in Rel. 11 (Release 11) of LTE-A. The CoMP reception is a scheme that causes a plurality of base stations (also referred to as reception points (RPs)) to receive a PUSCH data signal and a PUCCH control signal from a UE and to combine these signals, thereby improving the throughput. In particular, the CoMP reception is effective in a heterogeneous network (HetNet) environment where a pico cell or RRH (remote radio head) having a smaller coverage is placed in a macro cell. This is because large interference caused between a macro cell and a pico cell and considered as a problem in HetNet can be combined as a desired signal when the CoMP reception is performed.

As uplink CoMP in HetNet, an operation giving different $N_{cell\ ID}$ to macro cells and pico cells (CoMP scenario 3) and an operation giving the same $N_{cell\ ID}$ (CoMP scenario 4) are discussed.

In the case of CoMP scenario 3, as illustrated in FIG. 4, UEs use different sequence groups according to the connected macro cell and pico cell. At this time, if cells connected to a plurality of UEs to be simultaneously subjected to CoMP reception are different, and different sequence groups are used for DMRSs of the UEs, the DMRSs cannot be orthogonally demultiplexed, which results in deterioration of channel estimation accuracy due to interference.

On the other hand, in the case of CoMP scenario 4, as illustrated in FIG. 5, all UEs in a macro area use the same sequence group. Therefore, unlike CoMP scenario 3, different UEs use signal sequences obtained by cyclically shifting one base sequence using different shift amounts, thereby enabling orthogonal demultiplexing of DMRSs of the different UEs. However, only one sequence group can be used in a macro area, and therefore the number of usable signal sequences may be insufficient if the number of UEs increases.

In order to solve such problems described above, enabling allocation of another base sequence to the UEs is discussed. FIG. 6 explains an example in which some of the UEs use a base sequence not included in a base sequence group allocated to the cell under the HetNet environment. FIG. 6 does not illustrate UEs using a base sequence group allocated to the cell but illustrates only UEs using a base sequence not allocated thereto. However, such a favorable method of allocating a base sequence has not been found yet.

It is an object of the present invention to provide a terminal apparatus, a base station apparatus, and a communication method that can secure a large number of signal sequences that can be used by UEs in one cell without increasing deterioration of the process accuracy (deterioration of channel estimation accuracy in case of DMRSs and deterioration of estimation accuracy of channel quality in case of SRSs) due to interference to the reference signals.

Solution to Problem

A terminal apparatus according to an aspect of the present invention is configured to communicate with a base station in a communication system in which a plurality of reference signals of a plurality of sequence groups are beforehand determined in association with a plurality of sequence numbers, the sequence numbers each having an offset added thereto are allocated to cells, the offset temporally varies depending on a hopping pattern that is common in one cell cluster and that is different among a plurality of cell clusters, and the offset is different from those of other cells belonging to the same cell cluster, the apparatus comprising: a sequence determination section that determines the sequence number using a pattern that is different from an allocation pattern of the sequence number allocated to the cell which contains the terminal apparatus; a reference signal generation section that generates a reference signal of the sequence group corresponding to the determined sequence number; and a radio transmission section that transmits the generated reference signal to the base station, wherein the sequence determination section determines the sequence number that does not overlap with a cell-specific sequence number always, by adding a variable offset that regularly varies depending on time and that does not have the same value continuously, wherein the cell-specific sequence number is the sequence number allocated to the cell which contains the terminal apparatus.

A base station apparatus according to an aspect of the present invention is an apparatus in a communication system in which a plurality of reference signals of a plurality of sequence groups are beforehand determined in association with a plurality of sequence numbers, the sequence numbers each having an offset added thereto are allocated to cells, the offset temporally varies depending on a hopping pattern that is common in one cell cluster and that is different among a plurality of cell clusters, and the offset is different from those of other cells belonging to the same cell cluster, the apparatus comprising: a reception section that receives a radio signal from a terminal apparatus; and a signal extraction section that extracts the reference signal from the received radio signal, wherein the reference signal extracted by the signal extraction section includes the reference signal transmitted from the terminal apparatus in association with the sequence number which is determined by adding a cell-specific sequence number to a variable offset that regularly varies depending on time and that does not have the same value continuously, the determined sequence number not overlapping with the cell-specific sequence number always, wherein the cell-specific sequence number is the sequence number allocated to the cell which contains the terminal apparatus.

A communication method according to an aspect of the present invention is a method used in a communication system in which a plurality of reference signal of a plurality of sequence groups are beforehand determined in association with a plurality of sequence numbers, the sequence numbers each having an offset added thereto are allocated to cells, the offset temporally varies depending on a hopping pattern that is common in one cell cluster and that is different among a plurality of cell clusters, and the offset is different from those of other cells belonging to the same cell cluster, the method comprising: determining the sequence number that does not overlap with a cell-specific sequence number always, by adding a variable offset that regularly varies depending on time and that does not have the same value continuously to the cell-specific sequence number by a terminal apparatus, wherein the cell-specific sequence number is the sequence number allocated to the cell which contains the terminal apparatus; generating the reference signal of the sequence group corresponding to the determined sequence number by the terminal apparatus; transmitting the generated reference signal to a base station by the terminal apparatus; and receiving the transmitted reference signal by the base station.

Advantageous Effects of Invention

The present invention can secure a large number of signal sequences that can be used by UEs in one cell without increasing deterioration of channel estimation accuracy or estimation accuracy of channel quality due to interference in reference signals.

BRIEF DESCRIPTION OF THE DRAWINGS

FIG. 14 explains a third example of a sequence group allocated by signaling for an individual terminal in Embodiment 2;

DETAILED DESCRIPTION

Each embodiment of the present invention will be explained below in detail with reference to the accompanying drawings.

Embodiment 1

[Outline of Communication System]

A communication system according to the present embodiment includes a plurality of RPs 10 distributed at many points and a plurality of terminal apparatuses 20 moving freely around the respective points. The plurality of RPs 10 are placed at many points so that each macro cell can cover the almost entire moving ranges of the UEs. Each macro cell is supplied with 504 kinds of cell IDs ($N_{cell\_ID}$=0 to 503), and a plurality of cell clusters are configured by grouping the macro cells into 30 continuous macro cells. The present embodiment can also be applied to the case of CoMP scenario 3 allocating different cell IDs respectively to placed RPs 10 in addition to macro cells, in the completely same way.

If focusing on only a region around one terminal apparatus 20, the communication system according to the present embodiment includes one or more RPs 10 and terminal apparatus 20 in the macro cell. Here, when the plurality of RPs 10 are provided, the plurality of RPs 10 are connected through interfaces, such as optical fibers, having a low delay and a large capacity. RP 10 may be a macro base station covering the range of a macro cell and may be a pico base station covering the range of a pico cell. Alternatively, RP 10 may be a receiver that is connected to a network and used for uplink reception. Terminal apparatus 20 and RP 10 transmitting and receiving the PUSCH are mutually determined by a prior hand-over process and a prior control process.

[Configuration of RP 10 (Base Station)]

Figure 1:
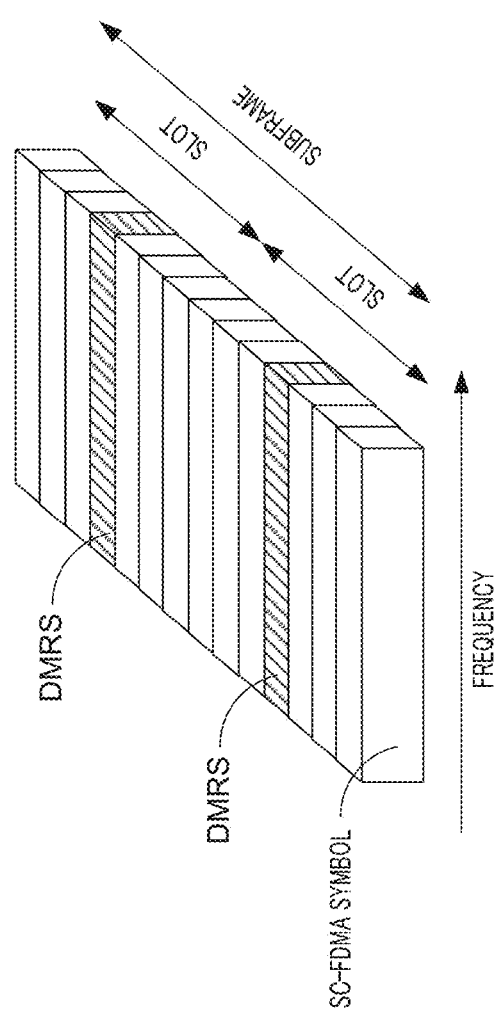
FIG. 1 illustrates a subframe configuration of a PUSCH to which a normal cyclic prefix is applied.
Figure 2:
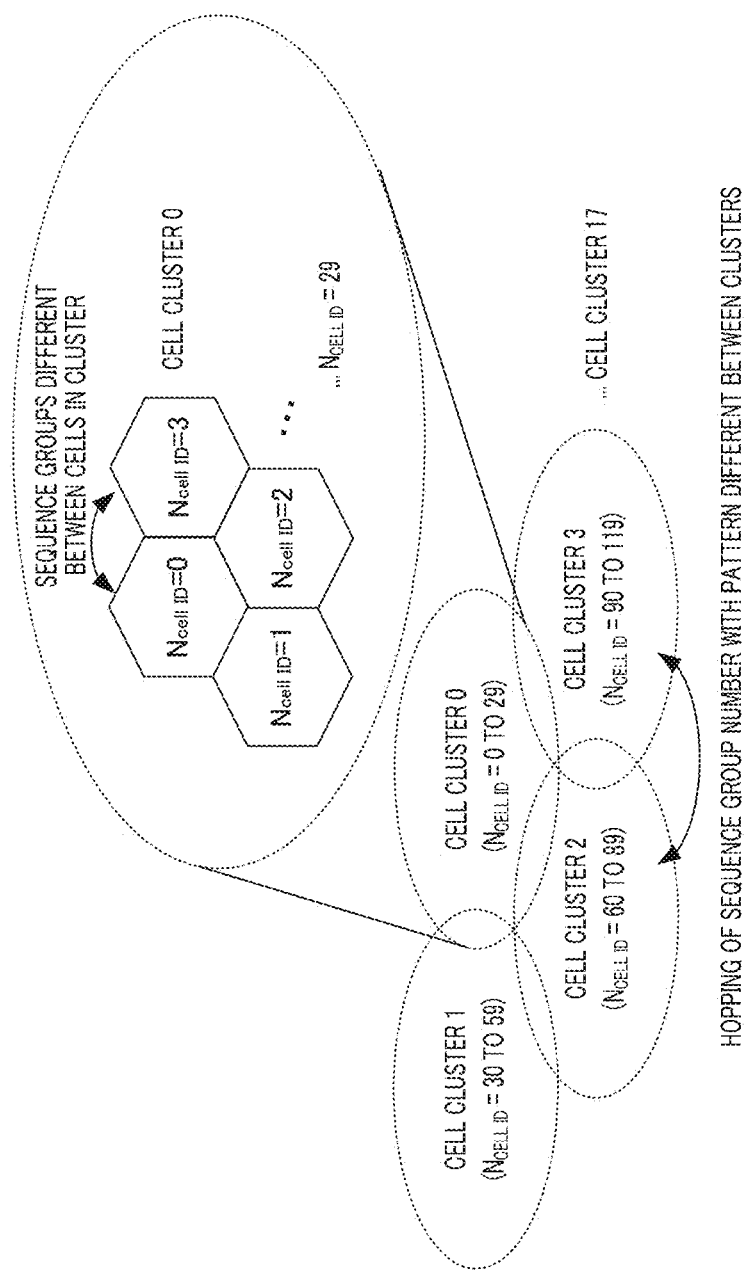
FIG. 2 illustrates the feature of a sequence group allocated to each cell.
Figure 3:
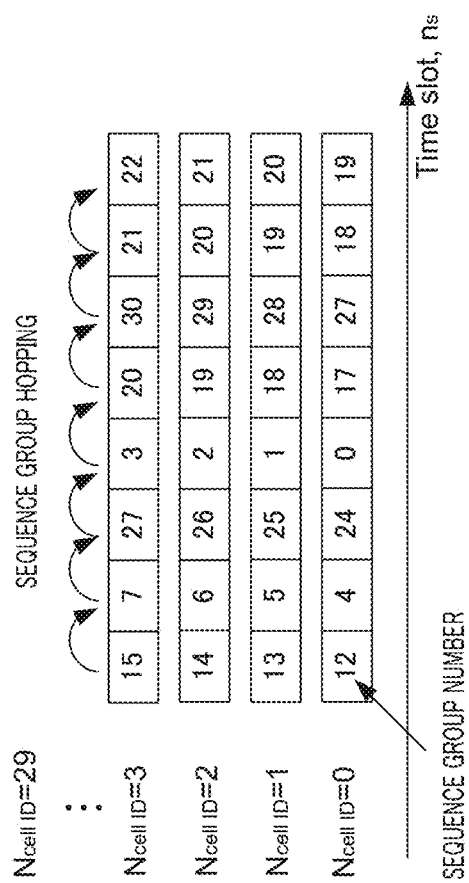
FIG. 3 illustrates an example of sequence group hopping.
Figure 4:
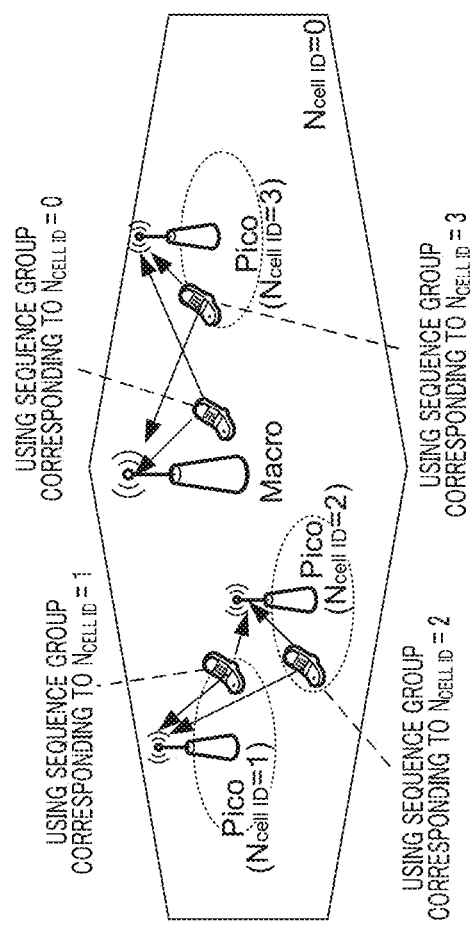
FIG. 4 is an explanatory diagram illustrating an example operation of CoMP scenario 3.
Figure 5:
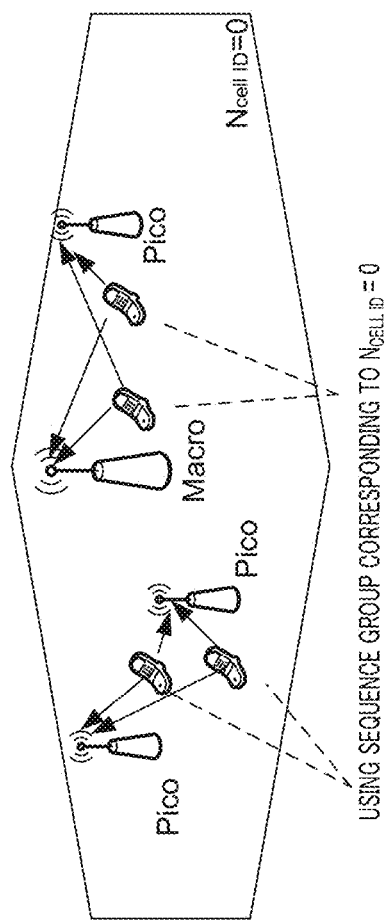
FIG. 5 is an explanatory diagram illustrating an example operation of CoMP scenario 4.
Figure 6:
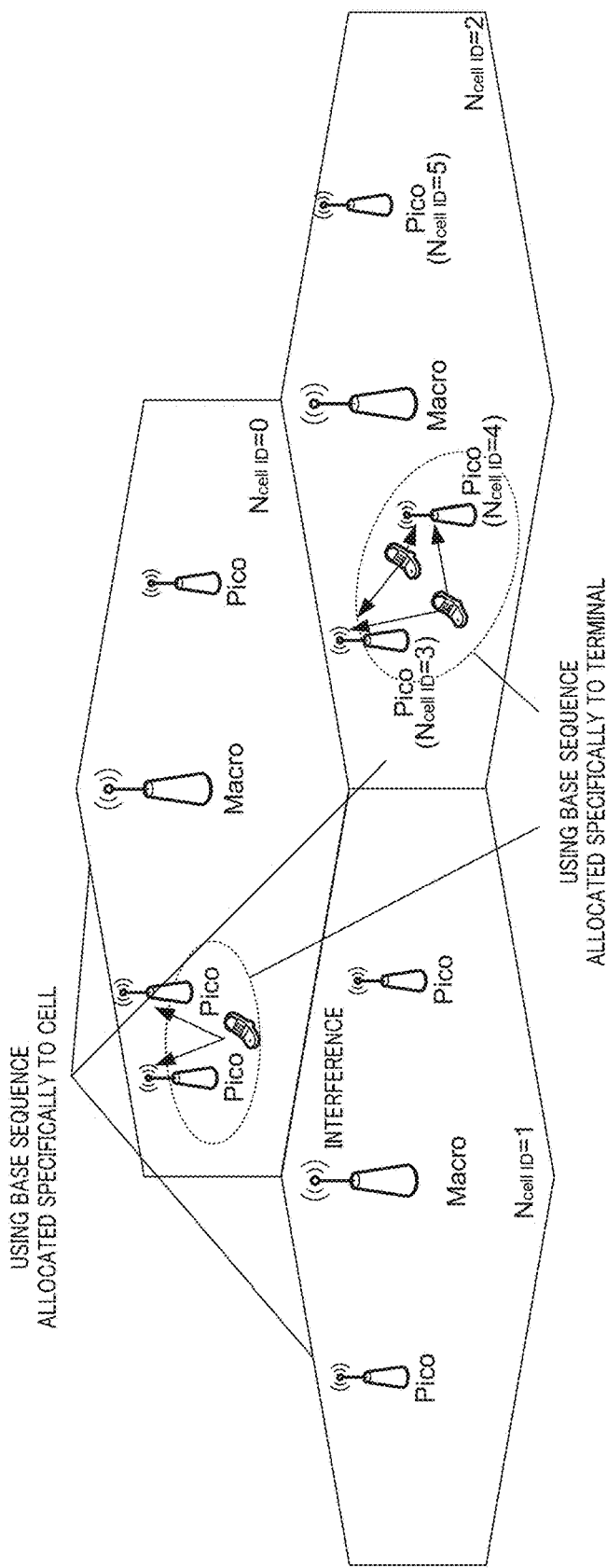
FIG. 6 explains an example in which some UEs use a base sequence not included in a base sequence group allocated to the cell under the HetNet environment.
Figure 7:
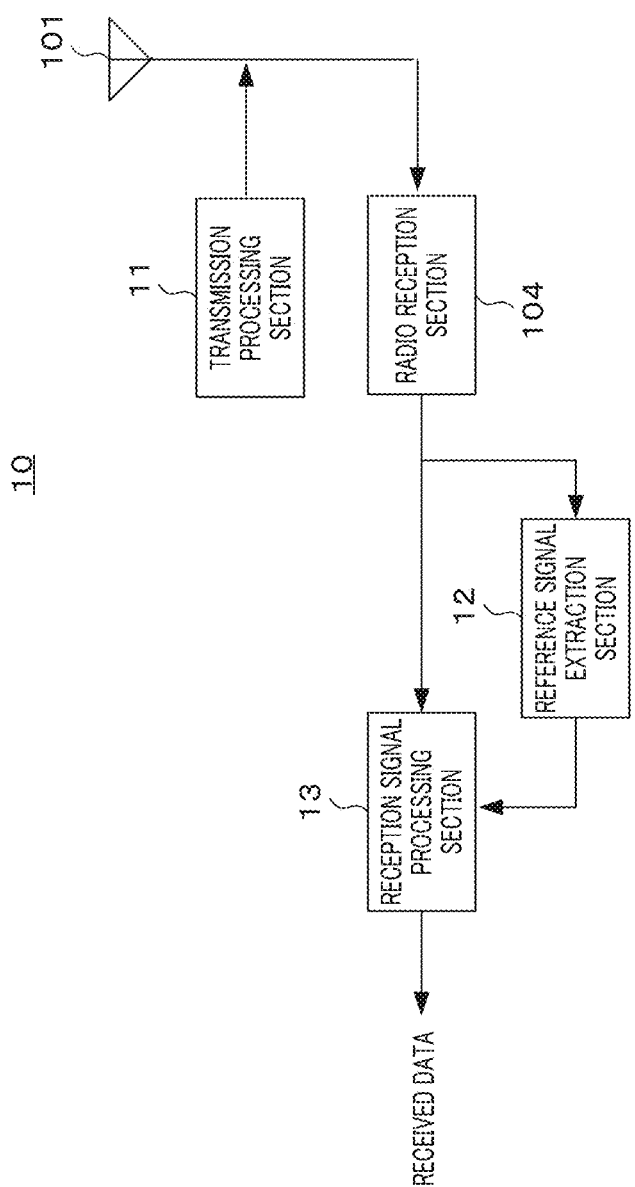
FIG. 7 is a functional block diagram illustrating a main part of an RP according to an embodiment of the present invention.

FIG. 7 is a functional block diagram illustrating a main part of RP 10 according to the embodiment of the present invention.

As illustrated in FIG. 7, RP 10 according to the present embodiment includes antenna 101, radio reception section 104 receiving a radio signal through antenna 101, reference signal extraction section 12 extracting a DMRS from the received signal, and reception signal processing section 13 removing received data from a data signal using the extracted DMRS. RP 10 includes transmission processing section 11 converting transmission data into a signal for radio transmission and radio-transmitting the signal through antenna 101.

When terminal apparatus 20 transmits the DMRS of a sequence group allocated to the cell, reference signal extraction section 12 extracts the DMRS of this signal sequence from the radio signal. Moreover, when terminal apparatus 20 transmits the DMRS of a sequence group different from that allocated to the cell, reference signal extraction section 12 extracts the DMRS according to this other sequence group from the radio signal. How to allocate the other sequence group will be explained below in detail.

Reception signal processing section 13 performs channel estimation from the extracted DMRS and removes received data from the signal received from terminal apparatus 20 using this channel estimation result.

Figure 8:
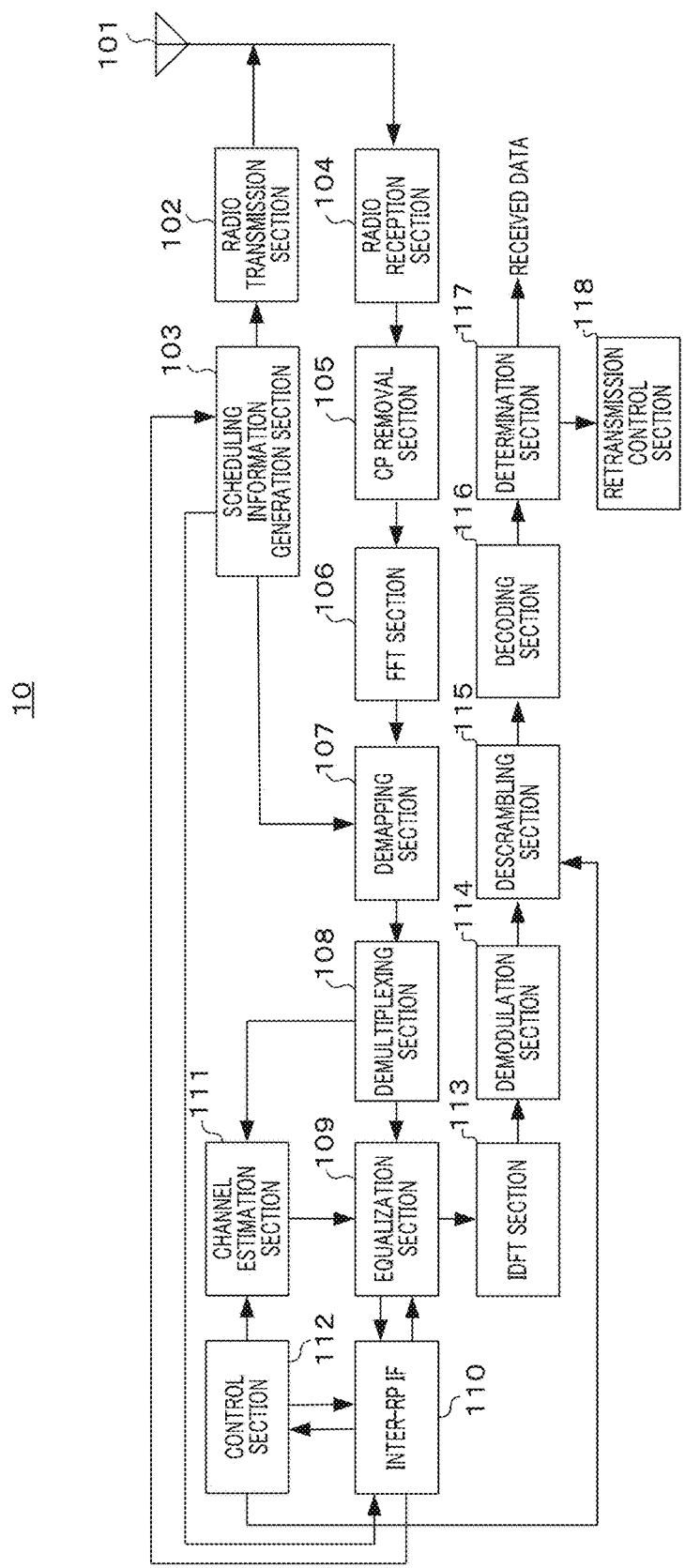
FIG. 8 is a block diagram illustrating the details of the RP according to the embodiment of the present invention.

FIG. 8 is a block diagram illustrating the details of RP 10 according to the embodiment of the present invention.

As illustrated in FIG. 8, RP 10 specifically includes antenna 101, radio transmission section 102, scheduling information generation section 103, radio reception section 104, CP removal section 105, FFT section 106, demapping section 107, demultiplexing section 108, equalization section 109, inter-RP IF (inter-RP interface) 110, channel estimation section 111, control section 112, IDFT section 113, demodulation section 114, descrambling section 115, decoding section 116, determination section 117, and retransmission control section 118. RP 10 receives a PUSCH data signal transmitted from the terminal and a PUCCH control signal.

In these sections, CP removal section 105, FFT section 106, demapping section 107, and demultiplexing section 108 function as reference signal extraction section 12 in FIG. 7. CP removal section 105, FFT section 106, demapping section 107, demultiplexing section 108, equalization section 109, inter-RP IF 110, channel estimation section 111, control section 112, IDFT section 113, demodulation section 114, descrambling section 115, decoding section 116, determination section 117, and retransmission control section 118 function as reception signal processing section 13 in FIG. 7. Scheduling information generation section 103 and radio transmission section 102 function as transmission processing section 11 in FIG. 7.

Hereinafter, the details of each section will be explained.

Control section 112 sends information on a base sequence used for a DMRS and information on a scrambling sequence used for scrambling data to channel estimation section 111 and descrambling section 115, respectively. Specifically, control section 112 performs the following processes.

Control section 112 generates a base sequence used for a DMRS multiplexed into the PUSCH data signal transmitted by terminal apparatus 20, and sends the base sequence to channel estimation section 111.

Whether a base sequence to be used by terminal apparatus 20 is allocated to a cell or allocated by signaling for an individual terminal is beforehand determined in the network and is indicated to terminal apparatus 20. The network refers to a whole network in which all RPs 10 and a plurality of control apparatuses controlling a communication system are wired-connected. This indication may be sent by correspondent RP 10 or may be sent by another RP 10 connected to the network. Moreover, this indication may be sent as RRC (Radio Resource Control) control information for an individual terminal, and may be indicated by being included in a MAC (Media Access Control) header. Alternatively, this indication may be sent by a control signal transmitted through a downlink (PDCCH). In addition, this indication is sent to terminal apparatus 20 only when a base sequence is allocated individually, and the base sequence allocated to the cell may be used when this indication is not sent.

When the base sequence allocated by signaling for an individual terminal is a sequence determined and indicated by correspondent RP 10, correspondent RP 10 indicates this information to another RP 10 through inter-RP IF 110. On the other hand, when the sequence is determined and indicated by another RP 10, correspondent RP 10 receives this information from the other RP 10 through inter-RP IF 110. Therefore, control section 112 can know the base sequence used by terminal apparatus 20.

Control section 112 also generates a scrambling sequence used for scrambling data and sends the scrambling sequence to the descrambling section. Whether a scrambling sequence to be used is allocated to a cell or allocated by signaling for an individual terminal is beforehand determined in the network and is indicated to terminal apparatus 20. These determination and indication may be performed by correspondent RP 10 and may be performed by another RP 10 connected to the network. Moreover, this indication may be sent as RRC (Radio Resource Control) control information for an individual terminal, and may be included in a MAC header. Alternatively, this indication may be sent by a control signal transmitted through a downlink (PDCCH). When this indication is not sent particularly, terminal apparatus 20 uses the scrambling sequence allocated to the cell.

When the scrambling sequence subject to signaling for an individual terminal is a sequence determined and indicated by correspondent RP 10 for terminal apparatus 20, correspondent RP 10 indicates the information to another RP 10 through inter-RP IF 110. On the other hand, when the scrambling sequences is determined and indicated by another RP 10 for terminal apparatus 20, correspondent RP 10 receives the information from the other RP 10 through inter-RP IF 110. Therefore, control section 112 can know the scrambling sequence used for scrambling on data.

Scheduling information generation section 103 indicates the bandwidth and the frequency position of a PUSCH included in a control signal (PDCCH) to terminal apparatus 20, through radio transmission section 102 and antenna 101. The determination of the bandwidth and the frequency position is called frequency mapping. An instruction on frequency mapping may be issued by correspondent RP 10 or may be issued by another RP 10 connected to the network.

When information on frequency mapping is information determined and indicated by correspondent RP 10 for terminal apparatus 20, scheduling information generation section 103 indicates the information to another RP 10 through inter-RP IF 110. On the other hand, when the information is determined and indicated by another RP 10 for terminal apparatus 20, scheduling information generation section 103 receives the information from the other RP 10 through inter-RP IF 110.

Scheduling information generation section 103 sends the above-described information on frequency mapping to demapping section 107.

Radio reception section 104 receives a PUSCH data signal transmitted from the terminal, through the antenna, and performs a reception process such as down conversion and A/D conversion.

CP removal section 105 removes a CP (Cyclic Prefix) added to the DMRS and the data signal of the PUSCH and sends the signal after the elimination to FFT section 106.

FFT section 106 applies FFT (Fast Fourier Transform) to the DMRS and the data signal of the PUSCH to convert the signals into frequency domain signals, and then sends the converted signals to demapping section 107.

Demapping section 107 demaps the inputted frequency domain PUSCH according to scheduling information.

Demultiplexing section 108 demultiplexes the DMRS and the data signal, which are time-multiplexed, from the PUSCH signal inputted from demapping section 107, and sends these signals to channel estimation section 111 and equalization section 109, respectively.

Channel estimation section 111 performs channel estimation using base sequence information inputted from control section 112 and a received DMRS inputted from demultiplexing section 108. Channel estimation section 111 sends a channel estimation result to equalization section 109.

Equalization section 109 performs the following processes.

Specifically, equalization section 109 equalizes the data signal inputted from demultiplexing section 108 using the channel estimation result inputted from channel estimation section 111. This process may be performed independently by each RP 10 participating in the reception. Alternatively, this process may be performed by single RP 10 among RPs 10 participating in the reception, by transmitting and receiving the channel estimation results and the data signals, which are acquired by the plurality of RPs 10, through inter-RP IF 110.

When each RP 10 participating in the reception performs the equalization independently, equalization section 109 transmits and receives the output of demultiplexing section 108 through inter-RP IF 110, and aggregates the results in one of RPs 10 participating in the reception. On the other hand, when single RP 10 among RPs 10 participating in the reception performs the equalization by transmitting and receiving the channel estimation results and the data signals, which are acquired by the plurality of RPs 10, through inter-RP IF 110, equalization section 109 performs the equalization using the plurality of aggregated channel estimation results and the plurality of received data signals.

In both of the above cases, the equalization output is obtained by equalization section 109 of single RP 10 among RPs 10 participating in the reception. Equalization section 109 outputs the signal that has been equalized and outputted, to IDFT section 113.

IDFT section 113 converts the equalized frequency domain data signal into a data symbol sequence in a time domain and sends this data symbol sequence to demodulation section 114.

Demodulation section 114 performs data demodulation on the input signal, acquires a bit sequence, and outputs the bit sequence to descrambling section 115.

Descrambling section 115 descrambles the bit sequence received from demodulation section 114, on the basis of information on a scrambling sequence received from control section 112. The bit sequence after the descrambling process is then outputted to decoding section 116.

Decoding section 116 performs error correction decoding on the input bit sequence and outputs the bit sequence after the decoding process to determination section 117.

Determination section 117 performs error detection on the inputted bit sequence. The error detection is performed using CRC bits added to the bit sequence. If the determination result based on the CRC bits has no error, determination section 117 removes received data and indicates ACK (Acknowledgement) to retransmission control section 118. On the other hand, if the determination result based on the CRC bits has an error, determination section 117 indicates NACK (Negative Acknowledgement) to retransmission control section 118.

Retransmission control section 118 performs retransmission control on the data signal of the bit sequence including the detected error.

[Configuration of Terminal Apparatus 20]

Figure 9:
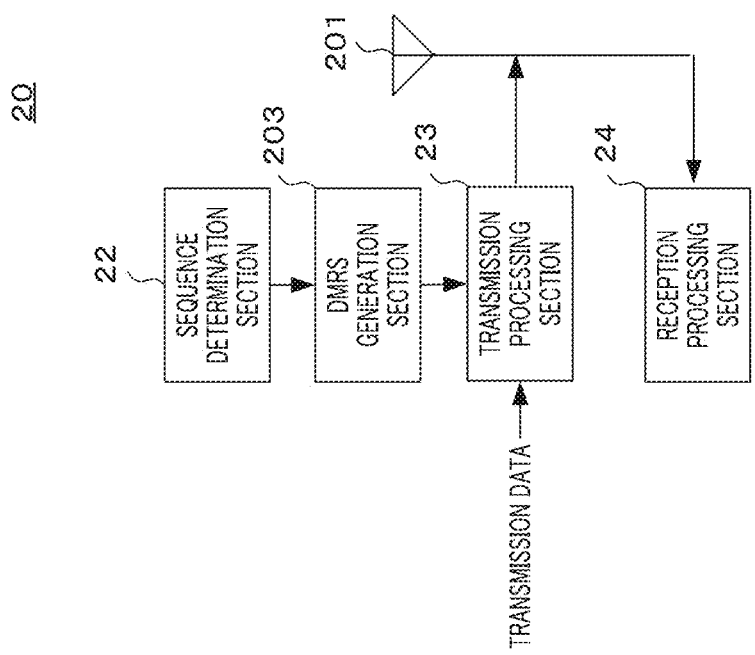
FIG. 9 is a functional block diagram illustrating a main part of a terminal apparatus according to an embodiment of the present invention.

FIG. 9 is a functional block diagram illustrating a main part of terminal apparatus 20 according to the embodiment of the present invention.

As illustrated in FIG. 9, terminal apparatus 20 according to the present embodiment includes antenna 201, sequence determination section 22 determining a sequence group used for generation of a DMRS, DMRS generation section 203 generating the DMRS using the determined sequence group, and transmission processing section 23 performing radio transmission by generating a signal for radio transmission from transmission data and the generated DMRS. Terminal apparatus 20 also includes reception processing section 24 receiving radio signal sent from RP 10 and extracting received data.

When an instruction to use the sequence group allocated to the cell is issued, sequence determination section 22 determines this sequence group as a sequence group for generating the DMRS. On the other hand, when an instruction to use a sequence group which is different from that allocated to the cell is issued, sequence determination section 22 determines this different sequence group as a sequence group for generating the DMRS. Hereinafter, a determination method for this different sequence group and an instruction indicating which sequence group to use will be explained in detail.

DMRS generation section 203 generates a DMRS of a sequence group determined in sequence determination section 22, and sends the DMRS to transmission processing section 23.

Transmission processing section 23 maps transmission data and the generated DMRS into a resource block to generate a transmission signal, and transmits this transmission signal by radio through antenna 201.

Figure 10:
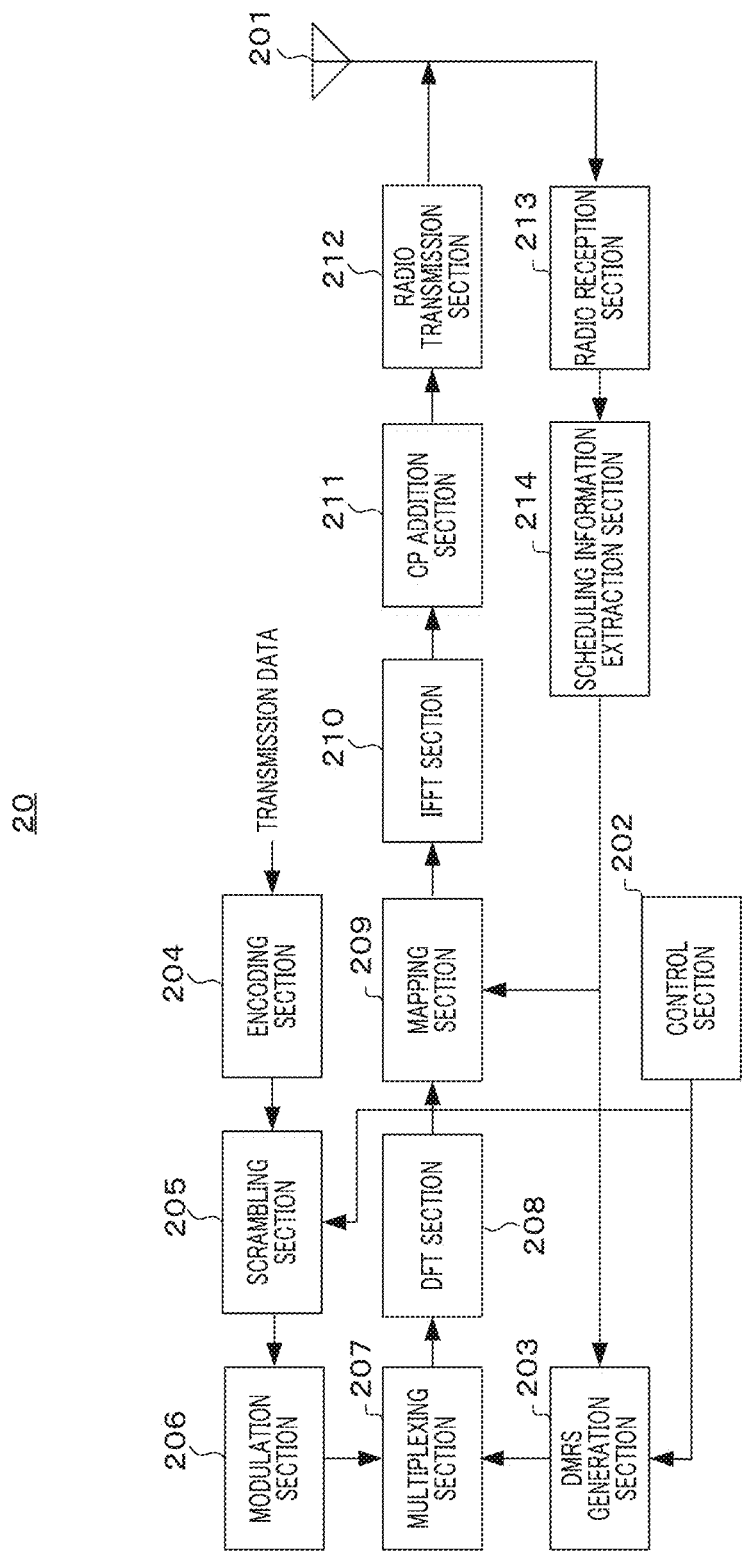
FIG. 10 is a block diagram illustrating the details of the terminal apparatus according to the embodiment of the present invention.

FIG. 10 is a block diagram illustrating the details of terminal apparatus 20 according to the embodiment of the present invention.

Specifically, as illustrated in FIG. 10, terminal apparatus 20 includes antenna 201, control section 202, DMRS generation section 203, encoding section 204, scrambling section 205, modulation section 206, multiplexing section 207, DFT section 208, mapping section 209, IFFT section 210, CP addition section 211, radio transmission section 212, radio reception section 213, and scheduling information extraction section 214. Terminal apparatus 20 transmits a PUSCH data signal and a PUCCH control signal to RP 10.

In these sections, control section 202 functions as sequence determination section 22 in FIG. 9. Control section 202 also includes a functional section (corresponding to a standard sequence determination section) determining a signal sequence to be used for a DMRS from the sequence group allocated to the cell. Encoding section 204, scrambling section 205, modulation section 206, multiplexing section 207, DFT section 208, mapping section 209, IFFT section 210, CP addition section 211, and radio transmission section 212 function as transmission processing section 23 in FIG. 9. Radio reception section 213 and scheduling information extraction section 214 function as reception processing section 24 in FIG. 9.

Next, the details of each section will be explained.

Control section 202 outputs information on a base sequence used for a DMRS and information on a scrambling sequence used for scrambling on data, to DMRS generation section 203 and scrambling section 205, respectively. Specifically, control section 202 performs the following processes.

Control section 202 outputs a base sequence used for a DMRS to be multiplexed on a PUSCH, to DMRS generation section 203. Whether the base sequence to be used is allocated to the cell or allocated by signaling for an individual terminal is beforehand indicated from the network to terminal apparatus 20. When this indication is not especially sent, terminal apparatus 20 may use the base sequence allocated to the cell.

Control section 202 generates a scrambling sequence to be used for scrambling on data and outputs the generated scrambling sequence to scrambling section 205. Whether the base sequence to be used is allocated to the cell or allocates by signaling for an individual terminal is beforehand indicated from the network to terminal apparatus 20. In the case of no indication, control section 202 generates the scrambling sequence allocated to the cell.

Encoding section 204 adds CRC bits to the bit sequence of transmission data inputted from a high layer configuration, performs error correcting coding, and outputs a codeword bit sequence to scrambling section 205.

Scrambling section 205 scrambles the code word bit sequence using the scrambling sequence inputted from control section 202. Scrambling section 205 then sends the result from the scrambling to modulation section 206.

Modulation section 206 performs data modulation on the inputted bit sequence and sends a data signal after the modulation to multiplexing section 207.

Scheduling information extraction section 214 first receives a downlink control signal (PDCCH) through antenna 201 and radio reception section 213, and obtains the bandwidth and the frequency position of a PUSCH indicated from the network. The bandwidth and the frequency position are called frequency mapping information. Scheduling information extraction section 214 then sends the acquired frequency mapping information to mapping section 209 and DMRS generation section 203.

DMRS generation section 203 generates a DMRS having a sequence length corresponding to the bandwidth of the PUSCH inputted from scheduling information extraction section 214 using the base sequence inputted from control section 202, and inputs the generated DMRS to multiplexing section 207.

Multiplexing section 207 configures a subframe while time-multiplexing the data signal inputted from modulation section 206 and the DMRS inputted from the DMRS generation section and sends the signal of this subframe to DFT section 208.

DFT section 208 applies DFT (Discrete Fourier Transform) to the input signal and acquires a frequency domain signal. DFT section 208 sends this frequency domain signal to mapping section 209.

Mapping section 209 maps the inputted frequency domain signal according to the frequency mapping information inputted from scheduling information extraction section 214, and sends the mapped signal to IFFT section 210.

IFFT section 210 applies IFFT (Inverse Fast Fourier Transform) to the input signal and acquires a time-domain signal, and outputs the acquired time-domain signal to CP addition section 211.

CP addition section 211 adds a CP (Cyclic Prefix) to the inputted data signal and DMRS and outputs the resultant signal to radio transmission section 212.

Radio transmission section 212 performs transmitting processes such as D/A conversion and up-conversion, and transmits a PUSCH signal to RP 10 through antenna 201.

[DMRS Transmission-Related Operations]

Next, the process flow relating to transmission of a DMRS will be explained with reference to Steps 1 to 5.

(Step 1) Before transmission and reception of a PUSCH, the network indicates whether a base sequence to be used for a DMRS is allocated to the cell or allocated by signaling for an individual terminal, to terminal apparatus 20. This indication is delivered to control section 202.

(Step 2) Upon receipt of an instruction to use the base sequence group allocated, control section 202 determines employment of a base sequence group given by expression 1. DMRS generation section 203 then generates the DMRS of this sequence group in response to an instruction from control section 202. When no instruction is particularly issued from the network, a DMRS is generated using the base sequence group given by expression 1.

On the other hand, when use of the base sequence allocated by signaling for an individual terminal is indicated, control section 202 determines employment of the base sequence group given by expression 3 described below. DMRS generation section 203 then generates the DMRS of this sequence group in response to an instruction from control section 202.

[3]

$$\tilde{u} = (f_{gh}(n_s) + \tilde{f}_{ss}(n_s)) \bmod 30 \quad \text{(Expression 3)}$$

In expression 3, $f_{ss}\sim(n_s)$ is a sequence offset amount varying depending on the value of $n_s$ (0 to 19) and has the following features.

[4]

$$\tilde{f}_{ss}(n_s) = (f_{ss} + F(n_s)) \bmod 30 \begin{cases} F(n_s) \bmod 30 \neq 0 & \text{(Expression 4)} \\ Pr[F(n_s) = x] \approx \frac{1}{X} \end{cases}$$

X is the total number of elements of a set of the values that can be taken by variable x, and Pr represents the probability to satisfy an expression in the brackets. In expression 4, $n_s$ represents each time slot in one cycle period ($n_s=0$ to 19) in which sequence groups are allocated repeatedly. Hereinafter, the variables and functions with a tilde symbol in expressions are indicated by attaching "~" to the side of the alphabet symbols.

Here, $F(n_s)$ represents the time variable component of a sequence offset (corresponding to the variable offset). Sequence number u~ to be allocated by signaling for an individual terminal is a value obtained by adding time variable component $F(n_s)$ of the variable offset to sequence number u to be allocated to the cell modulo 30 (refer to expression (1) and (3)). Therefore, a cell in which sequence number u allocated to the cell overlaps with sequence number u~ allocated by signaling for an individual terminal is determined by the value of $F(n_s)$.

The first expression of the simultaneous expressions of expression 4 represents a condition on which $F(n_s)$ is not equal to zero modulo 30. In other words, this expression represents a condition on which sequence number u~ allocated by signaling for an individual terminal always does not overlap with sequence number u allocated to the cell including terminal apparatus 20.

The second expression of the simultaneous expressions of expression 4 represents that if time variable component $F(n_s)$ of the sequence offset takes X different values x (=$x_1$, $x_2$, $x_3$ . . . ) during one cycle period ($n_s=0$ to 19), a probability that $F(n_s)$ is equal to each value is equal to 1/X. In other words, this expression represents a condition that each value (x=$x_1$, $x_2$, $x_3$ . . . ) appears equally as the value of $F(n_s)$.

If value x of $F(n_s)$ does not take the same value continuously, the same value may be taken around two or three times. In other words, in one cell, sequence number u allocated to the cell may discontinuously overlap with sequence number u~ allocated to terminal apparatus 20 around two or three times during one cycle period. This condition can be represented as $Pr[F(n_s)=x] \leq 3/X$.

Moreover, it is significantly favorable that time variable component $F(n_s)$ of the sequence offset takes values different from one another in one cycle period ($n_s=0$ to 19). In other words, it is significantly favorable that sequence number u allocated to each cell in the same cell cluster overlaps with sequence number u~ allocated by signaling for an individual terminal, and that the cell differs in all time slots $n_s$. In this case, the element number of a set of values which x can take is equal to X=20.

In addition, it is sufficient that cells corresponding to sequence numbers u and u~ that overlap with each other are distributed to such a degree that the cells differ at about 50 or more percent in one cycle period ($n_s=0$ to 19). This condition can be represented as $X \geq 0.5 \times 20$.

Figure 11:
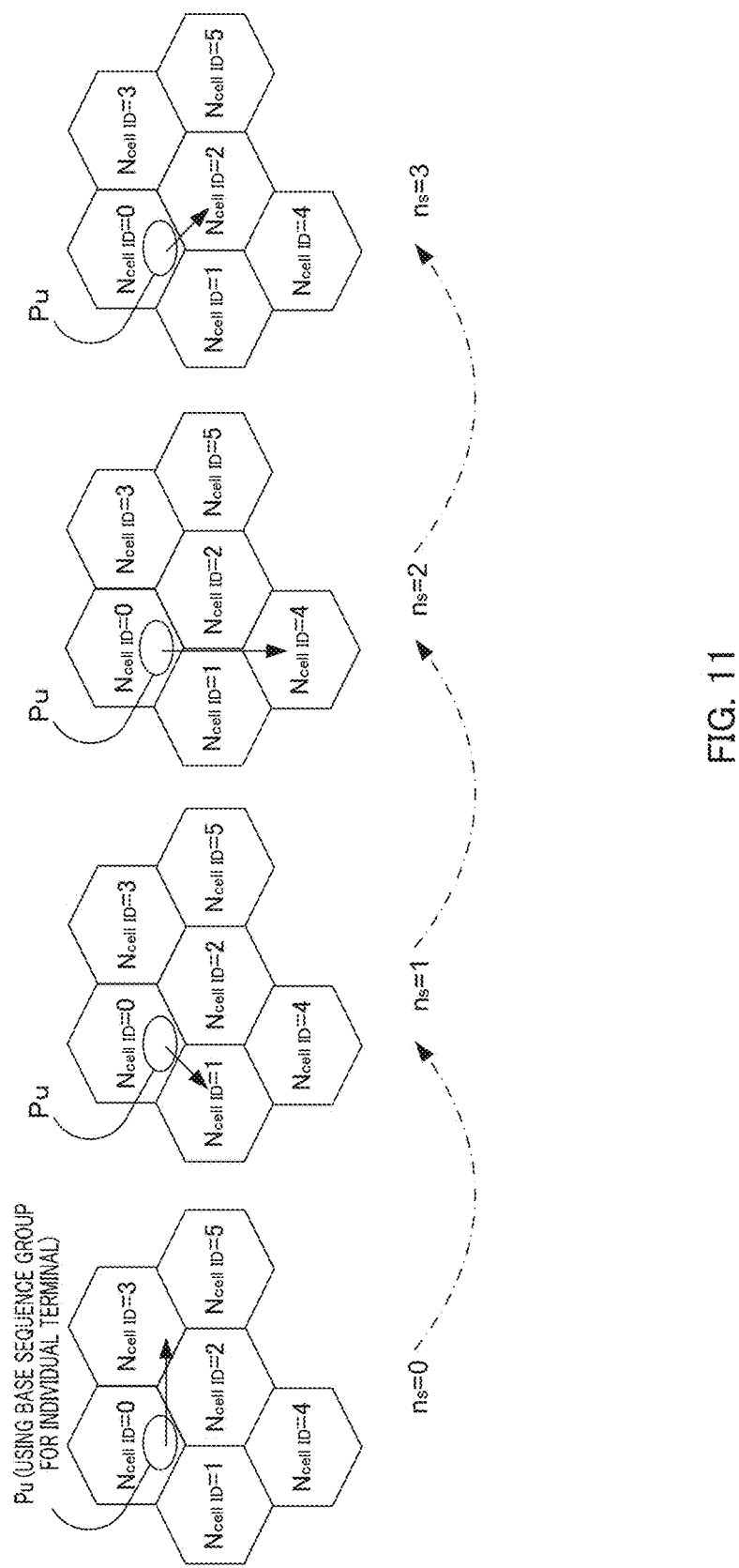
FIG. 11 illustrates the situation of interference between a sequence group allocated by signaling for an individual terminal and a sequence group allocated to the cell in Embodiment 1.

FIG. 11 illustrates the situation of interference between the base sequence group given by expressions 3 and 4 and the sequence group allocated to the cell.

In FIG. 11, six macro cells having $N_{cell\ ID}=0$ to 5 exist, and a base sequence group given by expressions 3 and 4 is used in a macro cell having $N_{cell\ ID}=0$. In the example of FIG. 11, the value of $\Delta_{ss}$ in expression 2 is set to 0 in any cell, but may be set to any value. These macro cells belong to the same cell cluster and use a common pattern of sequence group hopping.

In FIG. 11, an arrow extending from point Pu using a base sequence group given by expressions 3 and 4 indicates that this base sequence group overlaps a base sequence group allocated to a cell (referred to as a cell-specific base sequence group) indicated by the arrow. For example, in time slot $n_s=0$, the base sequence group given by expressions 3 and 4 overlaps with the cell-specific base sequence group of the macro cell having $N_{cell\ ID}=3$. Therefore, the influence of interference with a DMRS transmitted and received in this macro cell increases. However, in time slot $n_s=1$, the value of sequence offset $f_{ss}\text{~}(n_s)$ varies, and the base sequence group given by expressions 3 and 4 overlaps with the base sequence group allocated to the macro cell having $N_{cell\ ID}=1$. This base sequence group is different from that of the macro cell having $N_{cell\ ID}=3$ involving the previous overlapping. This reduces interference with a DMRS transmitted and received in the macro cell having $N_{cell\ ID}=3$. Similarly, each time slot $n_s$ varies as 2, 3, . . . , a cell involving the overlapping changes as the macro cell having $N_{cell\ ID}=4$, the macro cell of $N_{cell\ ID}=2$, . . . .

(Step 3) Terminal apparatus 20 configures a subframe while time-multiplexing the generated DMRS and data signal generated independently, and maps a PUSCH signal according to frequency mapping information indicated from RP 10. Then, this signal is transmitted to RP 10.

(Step 4) RP 10 demultiplexes the DMRS and the data signal from the received PUSCH signal. Then, RP 10 performs channel estimation using the DMRS.

(Step 5) RP 10 equalizes a data signal on the basis of the channel estimation result. Methods for this equalization include a method of independently performing equalization in the plurality of RPs 10 participating in the reception, and a method of collectively performing equalization by aggregating received signals from the plurality of RPs 10 participating in the reception. When each RP 10 independently performing equalization, the equalization result is aggregated in one of RPs 10, and RP 10 involving the aggregation performs demodulation and decode processes on the received data. On the other hand, when equalization is performed in an aggregated manner in the plurality of RPs 10 participating in the reception, the channel estimation result and the reception data signal are aggregated in one of RPs 10, and RP 10 involving the aggregation performs equalization and synthesis. Then, this RP 10 performs demodulation and decode on the received data.

As described above, according to the communication system, terminal apparatus 20, and RP 10 in Embodiment 1, terminal apparatus 20 is enabled to use a sequence group different from a sequence group allocated to the cell. This can secure many sequence groups that can be used by terminal apparatus 20 in one macro cell.

Furthermore, a sequence group allocated by signaling for an individual terminal always differs from a sequence group allocated to the macro cell including terminal apparatus 20. Therefore, a DMRS does not interfere with another terminal apparatus 20 using the cell-specific sequence group in the same macro cell.

Furthermore, a sequence group allocated by signaling for an individual terminal overlaps a sequence group allocated to another macro cell, but this overlapping does not continuously occur in the same macro cell. Furthermore, macro cells involving the overlapping are distributed in each time slot in the same cell cluster. Therefore, in relatively nearby cells, interference in DMRSs does not occur continuously. Therefore, in RPs 10 of each cell, the accuracy of channel estimation does not significantly deteriorate due to interference in DMRSs.

Furthermore, Embodiment 1 adds offset component $F(n_s)$ varying with time to the expression of a sequence group allocated specifically to a cell, and determines a sequence group allocated by individual signaling for terminal apparatus 20. Therefore, if this $F(n_s)$ is regular, the hopping pattern of a sequence group used by terminal apparatus 20 is not the same as or similar to the hopping pattern of another cell cluster. Therefore, in respective cells of another relatively distant cell clusters, any one cell does not tend to have overlapping sequence groups. That is, in cells of the other cell cluster, even if a cell has sequence groups overlapping continuously, such overlapping does not occur for a long period. Therefore, also in each RP 10 of the other cell cluster, the accuracy of channel estimation does not significantly deteriorate due to interference in DMRSs.

Moreover, existing base sequence group can be reused in order to secure many sequence groups that can be used by terminal apparatus 20 in one macro cell in Embodiment 1, and it is not necessary to define a new base sequence group or a new hopping pattern. Moreover, a sequence group allocated by signaling for an individual terminal can be determined only by adding one parameter $F(n_s)$ to the determination expression of a sequence group allocated specifically to a cell. Therefore, the circuit size for determining these sequence groups does not increase.

Embodiment 2

In a communication system according to Embodiment 2, only the allocation pattern of the base sequence group performed by signaling for an individual terminal differs from Embodiment 1. Therefore, only different points will be explained in detail.

A base sequence group allocated by signaling for an individual terminal in Embodiment 2 is characterized by sequence offset $f_{ss}\text{~}(n_s)$ of expression 5 described below. Number u~ of the base sequence group allocated by signaling for an individual terminal is determined by expression 3.

[5]

$$\tilde{f}_{ss}(n_s)=(f_{ss}+\lambda \cdot n_s+z) \bmod 30 \quad \text{(Expression 5)}$$

In expression 5, λ and z are integers that are not equal to 0.

Figure 12:
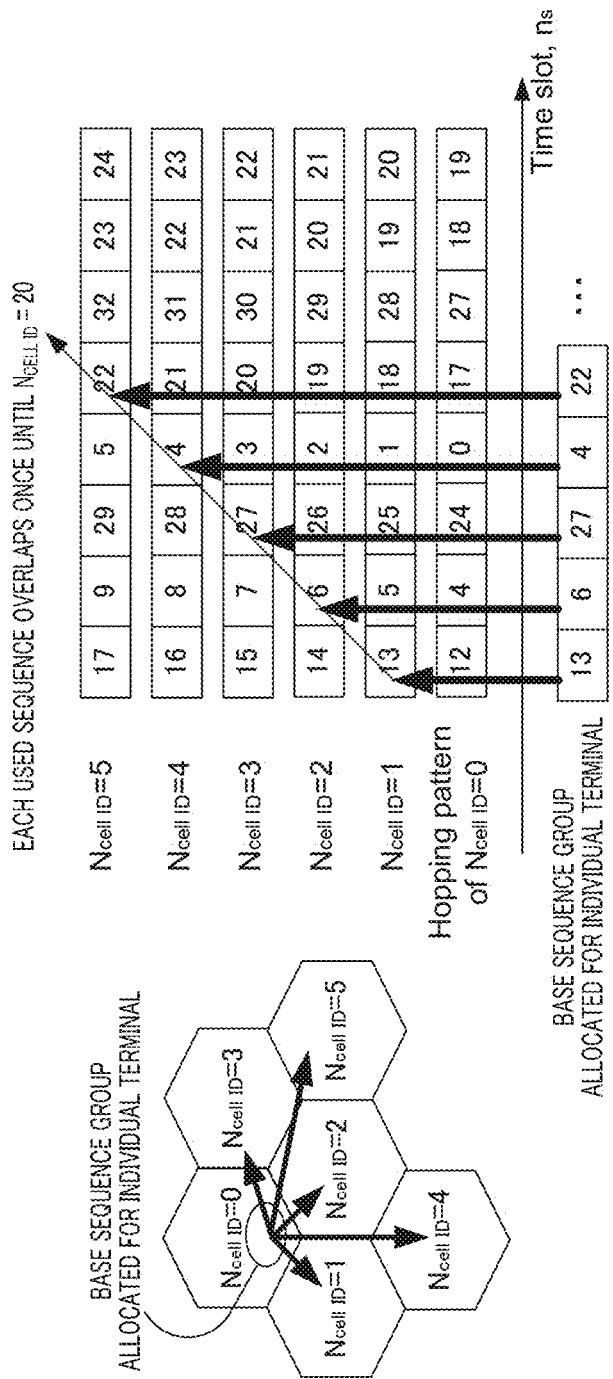
FIG. 12 explains the relationship between a first example of a sequence group allocated by signaling for an individual terminal and a sequence group allocated to the cell in Embodiment 2.

FIG. 12 illustrates allocation patterns of base sequence groups in λ=1 and z=1.

In this example, similarly to the case of FIG. 11, assuming that some terminal apparatuses 20 in the macro cell having $N_{cell\ ID}=0$ use a base sequence group determined by expression 5. In this case, a base sequence group allocated to these terminal apparatuses 20 overlaps with a base sequence group allocated to the macro cell having $N_{cell\ ID}=1$ in time slot $n_s=0$. The base sequence group overlaps with a base sequence group allocated to the macro cell having $N_{cell\ ID}=2$ in time slot $n_s=1$. Similarly, base sequence groups allocated to the terminal apparatus 20 in time slots $n_s=2$ to 19 sequentially overlap with each of the base sequence groups allocated to the macro cells having $N_{cell\ ID}=3$ to 20 once. On the other hand, base sequence groups allocated to terminal apparatus 20 do not overlap with base sequence groups allocated to the cells having $N_{cell\ ID}=0$ and $N_{cell\ ID}=21$ to 29 once.

Attention is focused on the case where a base sequence group is allocated to terminal apparatus 20 in the macro cell having $N_{cell\ ID}=1$ on the basis of expression 5. In this case, the sequence group overlaps with a base sequence group allocated to the cell having $N_{cell\ ID}=2$ in time slot $n_s=0$, and overlaps with a base sequence group allocated to the cell having $N_{cell\ ID}=3$ in time slot $n_s=1$. Subsequent overlapping of the sequence group similarly occurs in each of the plurality of cells until $n_s=19$ once.

Here, sequence groups allocated by signaling for an individual terminal are compared between the macro cell having $N_{cell\ ID}=0$ and the macro cell having $N_{cell\ ID}=1$. As a result, these sequence groups are always different from each other in each time slot $n_s$. As described above, it is found that overlapping always does not occur between base sequence groups individually allocated to respective terminal apparatuses 20 connected to different cells belonging to the same cell cluster.

Figure 13:
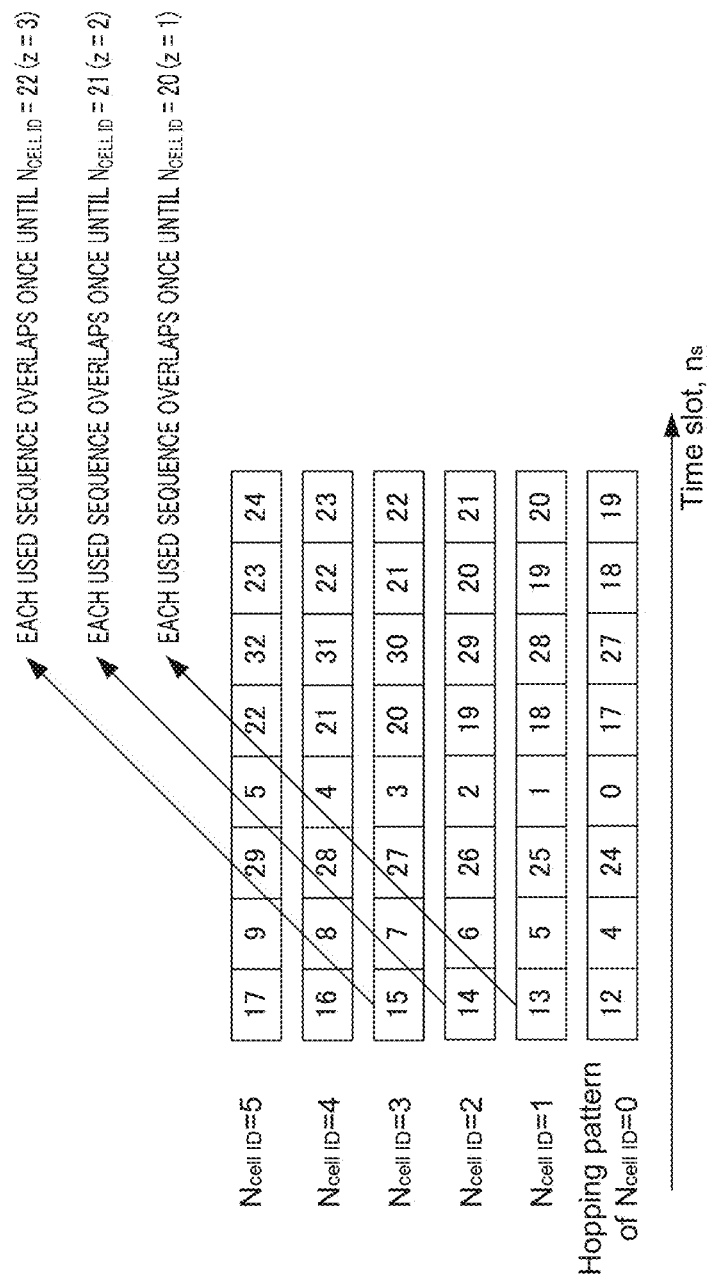
FIG. 13 explains a second example of a sequence group allocated by signaling for an individual terminal in Embodiment 2.

FIG. 13 illustrates allocation patterns of base sequence groups in the case of varying parameter z. FIG. 14 illustrates allocation patterns of base sequence groups in the case of varying parameter λ. FIGS. 13 and 14 illustrate that a base sequence group of each cell overlapping with an arrow line overlaps with a base sequence group allocated by signaling for an individual terminal in each time slot.

As illustrated in FIGS. 13 and 14, variations in parameters λ and z cause variations in allocation patterns of base sequence groups by signaling for an individual terminal. As illustrated in FIG. 13, a variation in parameter z cause variations in the allocation patterns so that a cell and time slot $n_s$ which involve overlapping of base sequence groups may be shifted by a number proportional to parameter z. As illustrated in FIG. 14, a variation in parameter λ may also cause, for example, such a variation that base sequence groups overlap twice in a cell.

As described above, according to the communication system, terminal apparatus 20, and RP 10 in Embodiment 2, the same advantageous effects as Embodiment 1 can be acquired only by adding a time variable component of a simple linear function to a sequence offset.

Furthermore, according to Embodiment 2, parameter z and parameter λ are suitably selected to thereby enable constant prevention of overlapping between respective sequence groups allocated by signaling for an individual terminal in a plurality of cells belonging to the same cell cluster. Therefore, interference in DMRSs does not occur between the plurality of terminal apparatuses 20 included in each of a plurality of cells subject to this allocation. Moreover, suitable selection of parameter z and parameter λ for each cell also enables such configuration that the above-described sequence groups overlap only at a predetermined ratio.

Embodiment 2 has been described using an example configuration based on adding a linear function of time slot $n_s$ to sequence offset $f_{ss}$. However, as long as the conditions of expression 4 is satisfied, Embodiment 2 may be provided by applying a configuration based on adding a polynomial, such as a quadratic function of time slot $n_s$, or various functions to sequence offset $f_{ss}$.

Moreover, Embodiment 2 has been described using an example configuration based on finding sequence offset $\tilde{f}_{ss}(n_s)$ including a time variable component through a calculation process. However, an alternative configuration may also be employed in which such sequence offset $\tilde{f}_{ss}(n_s)$ is stored in a storing section, for example, as a data table, and then control section 202 reads and finds the sequence offset from the storing section.

An example of a data table storing sequence offset $\tilde{f}_{ss}(n_s)$ will be illustrated below.

TABLE 1

| $n_s$ | $\tilde{f}_{ss}(n_s)$ |
|---|---|
| 0 | $f_{ss}$ + 10 |
| 1 | $f_{ss}$ + 5 |
| 2 | $f_{ss}$ + 8 |
| 3 | $f_{ss}$ + 2 |
| 4 | $f_{ss}$ + 9 |
| 5 | $f_{ss}$ + 1 |
| . | . |
| . | . |
| . | . |
| 19 | $f_{ss}$ + 6 |

The configuration in which to store sequence offset $\tilde{f}_{ss}(n_s)$ including a time variable component can be employed as described above to thereby represent even a sequence offset including a time variable component that cannot be represented by a simple function easily. Moreover, sequence offsets do not need to be found through calculation, and therefore a necessary calculation circuit can be reduced.

Embodiment 3

In a communication system according to Embodiment 3, the allocation pattern of a base sequence group by signaling for an individual terminal is applicable to an OCC multiplex transmission scheme for a DMRS, and the configuration other than that is the same as that of Embodiment 1. Therefore, only different points will be explained in detail.

In a PUSCH, two DMRSs located in a subframe are multiplied by [+1, +1] or [+1, −1] as an orthogonal cover code (OCC) to thereby enable two different terminal apparatuses 20 to code-multiplex and transmit the DMRSs of the same sequence. However, in this transmission scheme, each terminal apparatus 20 needs to use a DMRS of the same sequence in two time slots of a subframe.

Incidentally, Rel. 10 of LTE-A includes a mechanism for stopping the hopping of a base sequence group by a terminal-specific RRC control signal, and can stop the hopping to thereby employ DMRS transmission using OCC multiplex.

Figure 15:
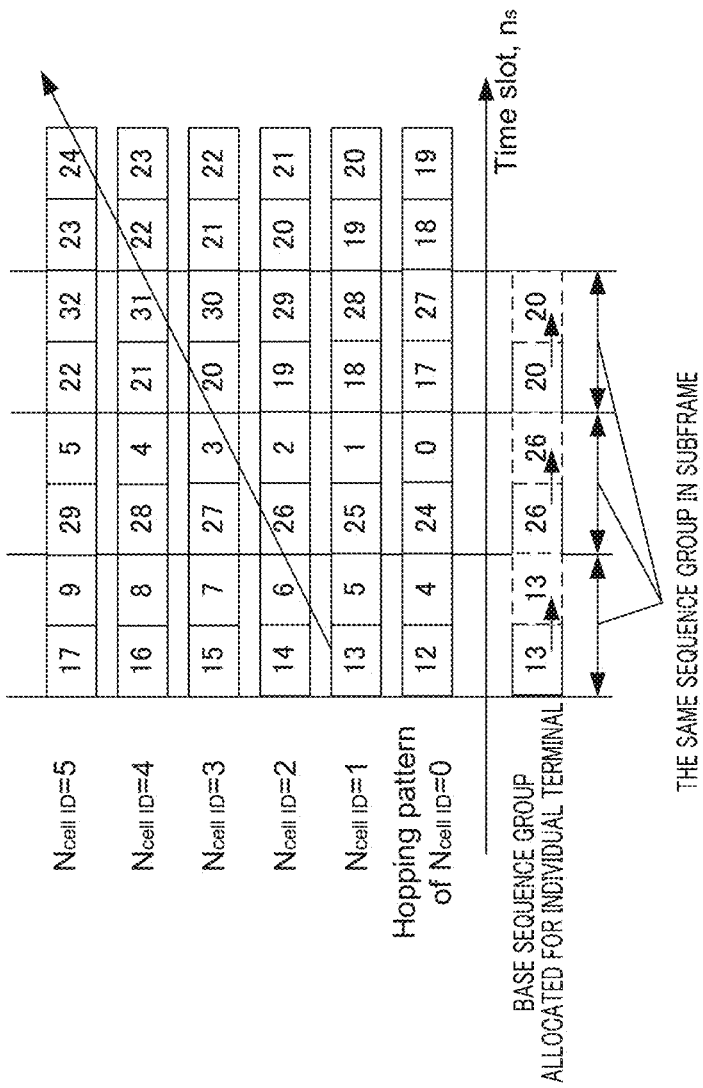
FIG. 15 illustrates a sequence group allocated by signaling for an individual terminal in Embodiment 3.

FIG. 15 is an explanatory diagram illustrating sequence groups allocated by signaling for an individual terminal in Embodiment 3.

As illustrated in FIG. 15, sequence groups allocated by signaling for an individual terminal in Embodiment 3 employ configurations in which a base sequence group is allocated by adding sequence offsets of expressions different between an odd time slot ($n_s$ mod 2=1) and an even time slot ($n_s$ mod 2=0). Consequently, Embodiment 3 allocates the same sequence number to an odd time slot ($n_s$ mod 2=1) and an even time slot ($n_s$ mod 2=0).

Specifically, such allocation can be implemented as follows. That is, a configuration adding sequence offsets of expression 6 described below in an odd time slot and an even time slot and obtaining sequence numbers can be employed.

[6]

In a time slot satisfying ($n_s$ mod 2)=0, $$\tilde{f}_{ss}(n_s)=(f_{ss}+\lambda \cdot n_s/2+z) \bmod 30$$

In a time slot satisfying ($n_s$ mod 2)=1, $$\tilde{f}_{ss}(n_s)=\tilde{f}_{ss}(n_s-1) \qquad \text{(Expression 6)}$$

As a specific example of this, FIG. 15 illustrates base sequence group hopping patterns in λ=1 and z=1. As illustrated in FIG. 15, it is found that base sequence groups are the same in two time slots in a subframe.

According to the communication system of Embodiment 3, base sequence groups allocated by signaling for an individual terminal can be used for transmission of DMRSs using an OCC multiplex in two terminal apparatuses 20.

Moreover, a base sequence group allocated to the cell has a sequence varying in units of slots. Therefore, a sequence group allocated by signaling for an individual terminal does not continuously overlap with a sequence group allocated to the cell in the same macro cell. Therefore, a method for allocating a base sequence group in Embodiment 3 can also reduce interference from a DMRS of terminal apparatus 20 having a sequence group allocated by signaling for an individual terminal with a DMRS of terminal apparatus 20 to which a cell-specific sequence group is applied, similarly to Embodiment 1 and Embodiment 2.

In Embodiment 3, an alternative configuration can also be employed in which sequence offset $f_{ss}\sim(n_s)$ including a time variable component is stored in a storing section as a data table and then is read and found from the storing section.

An example of a data table storing sequence offset $f_{ss}\sim(n_s)$ in Embodiment 3 will be illustrated below.

TABLE 2

| $n_s$ | $\tilde{f}_{ss}(n_s)$ |
|---|---|
| 0 | $f_{ss}$ + 10 |
| 1 | $f_{ss}$ + 10 |
| 2 | $f_{ss}$ + 2 |
| 3 | $f_{ss}$ + 2 |
| 4 | $f_{ss}$ + 4 |
| 5 | $f_{ss}$ + 4 |
| . | . |
| . | . |
| . | . |
| 19 | $f_{ss}$ + 6 |

The configuration in which to store sequence offset $f_{ss}\sim(n_s)$ including a time variable component can be employed as described above to thereby represent the same sequence offsets in two continuous time slots easily. Furthermore, the configuration can easily represent even a sequence offset including a time variable component that cannot be represented by a simple function. Moreover, sequence offsets do not need to be found through calculation, and therefore a necessary calculation circuit can be reduced.

In addition, Embodiment 3 may switch whether hopping of a base sequence group allocated for an individual terminal has a pattern varying for each time slot or a pattern varying for each subframe, according to a next control parameter.

In Rel. 10 of LTE-A, signaling of the high-order layer aiming at performing DMRS multiplex by an OCC has already been regulated. This signaling is performed using control parameters of "dmrs-WithOCC-Activated" or "groupHoppingDisabled" indicated for an individual terminal by RRC control information.

Therefore, when a base sequence group is allocated by terminal-specific signaling in Embodiment 3, one of the control parameters, i.e., "dmrs-WithOCC-Activated" and "groupHoppingDisabled" can be used. When one of the control parameters, i.e., "dmrs-WithOCC-Activated" and "groupHoppingDisabled" is "True", terminal apparatus 20 employs a hopping pattern varying for each subframe using a sequence offset from expression 6 or Table 1, and generates a DMRS subject to OCC multiplex. On the other hand, when one of the control parameters, i.e., "dmrs-WithOCC-Activated" and "groupHoppingDisabled" is "False", terminal apparatus 20 employs a hopping pattern varying for each time slot using a sequence offset described in Embodiment 2, and generates a DMRS.

Such a configuration can transmit a DMRS subject to OCC multiplex between terminals using base sequence groups allocated by terminal-specific signaling without adding new signaling.

Embodiment 4

In configurations of a communication system, terminal apparatus 20, and RP 10 according to Embodiment 4, a network determines the allocation pattern of a base sequence group performed by signaling for an individual terminal, and indicates the allocation pattern to terminal apparatus 20. The configurations other than that are the same as those of Embodiment 2. Hereinafter, different points will be explained in detail.

[Outline of Communication System]

The communication system in Embodiment 4 includes including one or more RPs 10 in a macro cell and terminal apparatus 20 similarly to Embodiment 1. In the communication system of Embodiment 4, the network beforehand determines parameters "λ, z" in Expression 5 or 6 representing a base sequence group allocated by signaling for an individual terminal.

[Configuration of RP 10]

Control section 112 of RP 10 outputs parameters "λ, z" to channel estimation section 111. Parameters "λ, z" are beforehand determined in the network and are indicated to RP 10 through inter-RP IF 110. Correspondent RP 10 may determine parameters "λ, z." When correspondent RP 10 determines the parameters, the information is indicated to another RP 10 through inter-RP IF 110. On the other hand, when another RP 10 determines the parameters, correspondent RP 10 receives the information from the other RP 10 through inter-RP IF 110.

[Configuration of Terminal Apparatus 20]

Control section 202 of terminal apparatus 20 inputs parameters "λ, z" into DMRS generation section 203. Parameters "λ, z" are beforehand determined in the network and are indicated to terminal apparatus 20. This indication may be sent as RRC control information for an individual terminal and may be included in a MAC header. Alternatively, this indication may be sent by a control signal transmitted through a downlink (PDCCH). When this indication is not especially sent, both parameters "λ, z" are set to "0" (equivalent to using the base sequence group allocated to the cell).

[DMRS Transmission-Related Operations]

In the communication system of Embodiment 4, when new parameters "λ, z" are indicated from the network to terminal apparatus 20, control section 202 of terminal apparatus 20 overwrites parameter "λ, z" in expression 5 (or expression 6). Moreover, when indicating new parameters "λ, z" to terminal apparatus 20, the network indicates parameters "λ, z" to control section 112 of each RP 10 participating in the reception, and control section 112 of RP 10 overwrites parameters "λ, z" in expression 5 (or expression 6).

Other process flows relating to transmission of DMRSs performed by RP 10 and terminal apparatus 20 are the same as those in Embodiment 1.

According to the communication system, RP 10, and terminal apparatus 20 in Embodiment 4, the network can appropriately select parameters "λ, z" according to the placement of the cells to thereby set sequence groups suitable for the placement of the cells. Specifically, the network enable a control so as to determine a sequence group allocated by signaling for an individual terminal in terminal apparatus 20 so that overlapping of sequence groups does not occur in other nearby cells tending to involve large influence of interference.

Instead of a configuration indication parameter information that can represent all the values and combination that can be taken as parameters "λ, z," the network or RP 10 may also have a configuration indication parameter information that has a small bit length and can represent only some of the combinations of parameters "λ, z." This configuration can reduce the number of transmission bits required for the indication of parameters "λ, z".

Alternatively, a configuration may be used in which a region of nine or more bits of established control data is defined as an indication region for terminal-specific signaling, and the information on this indication region is used to determine a base sequence group used for generation of a DMRS by terminal apparatus 20. Specifically, when a value (for example, 0 to 503 in the case of nine bits) representing a cell ID is indicated in the indication region, terminal apparatus 20 generates a DMRS using a base sequence group obtained by rewriting $N_{cell\ ID}$ in expressions 1 and 2 with a value corresponding to the information in the indication region. Moreover, when a value not representing a cell ID is indicated in the indication region, a DMRS is generated using a base sequence group given by expression 3 (for example, expressions 5 and 6). This configuration may also be used. Also in such a configuration, when information in the indication region is not indicated, terminal apparatus 20 can generate a DMRS using a base sequence group allocated to the cell.

This configuration can select a base sequence group used for generation of a DMRS by terminal apparatus 20, according to the value of the indication information. That is, a base sequence group to be used can be selected from a base sequence group allocated a connected cell, a base sequence group allocated to an unconnected cell, and a base sequence group allocated for an individual terminal.

Furthermore, a configuration may be employed in which parameters "λ, z" are associated with values representing information other than a cell ID in the indication region, and are indicated to terminal apparatus 20 using the value representing information other than a cell ID. Specifically, values representing information other than a cell ID (for example, 504 to 511 in the case of nine bits) in the indication region are associated with eight combinations of parameters "λ, z," and when this value is indicated, control section 202 of terminal apparatus 20 overwrites parameters "λ, z" in expression 5 (or Expression 6). Terminal apparatus 20 then generates and transmits a DMRS using a sequence group determined by expression 5 (or expression 6) after the overwriting.

This configuration enable the network to select parameters "λ, z" suitable for the cell placement and to indicate the parameters to terminal apparatus 20, without adding a new indication bit.

The indication region has nine or more bits in the above explanation of the configuration, but can also have less than nine bits. When a cell-specific base sequence group of another cell is allocated as a base sequence group allocated by signaling for an individual terminal, allocating the same base sequence group as that of a nearby cell should be avoided in order to suppress influence of the interference. Especially, influence of the interference may be increased by allocating a base sequence group of another cell in the same cell cluster for an individual terminal. Therefore, the number of base sequence groups allocated to other cells that can be used as terminal-specific base sequence groups in reality is smaller than the number of all the cell IDs of "504." Therefore, the cell ID of a cell-specific base sequence group that can be allocated can be indicated with the number of indication bits smaller than nine. For example, the offset for the cell ID of a connected cell can be indicated with the number of indication bits smaller than nine, and the cell ID of another cell can be indicated.

This configuration can reduce the number of bits of indication information.

Embodiment 5

Hereinafter, other examples will be explained on a determination method for a base sequence group allocated by signaling for an individual terminal.

In Embodiments 1 to 4, sequence offset $f_{ss}\sim$ is represented by a function of time slot $n_s$. In contrast to this, in Embodiment 5, sequence offset $f_{ss}$ is a fixed value, and PN hopping pattern $f_{gh}\sim$ is represented as a function of time slot $n_s$. Specifically, Embodiment 5 determines sequence number u~ using expression 7.

[7]

$$\tilde{u} = (\tilde{f}_{gh}(n_s) + f_{ss}) \bmod 30 \quad \text{(Expression 7)}$$

In expression 7, $\tilde{f}_{gh}(n_s)$ is a sequence group hopping pattern determined by a PN sequence having an initial value equal to $\lfloor N_{cell\ ID}/30 \rfloor + G(n_s)$, and $G(n_s)$ is a function satisfying a condition of Expression 8 described below. A symbol $\lfloor\ \rfloor$ refers to truncation after the decimal point.

[8]

$$\begin{cases} G(n_s) \bmod 30 \neq 0 \\ Pr[G(n_s) = y] \approx \dfrac{1}{Y} \end{cases} \quad \text{(Expression 8)}$$

Here, Y is the total number of values that can be taken by variable y. When sequence number u~ overlaps with a base sequence group allocated to the connected cell in expression 7, a different value is substituted into sequence number u~. Alternatively, $f_{gh}\sim(n_s)$ may be given as values stored as a data table in a storing section instead of a function.

According to this determination method for a base sequence group, hopping of the sequence group is enabled using new hopping pattern different from all cell clusters, without significantly changing the determination expression for a base sequence group given by expressions 1 and 2.

Alternatively, sequence offset $f_{ss}\sim(n_s)$ including a time variable component described in Embodiments 1 to 4 may be added to hopping pattern $f_{gh}\sim(n_s)$ given by the above-described function of time slot $n_s$ to thereby determine sequence number u~. Moreover, both the PN hopping pattern and the sequence offset represented by functions of time slot $n_s$ may also be provided as a data table.

Embodiment 6

Embodiment 6 solves a problem of securing a large number of base sequence groups that can be used by terminal apparatus 20 in a connected cell when the influence of interference with another cell is not significantly large.

Figure 16:
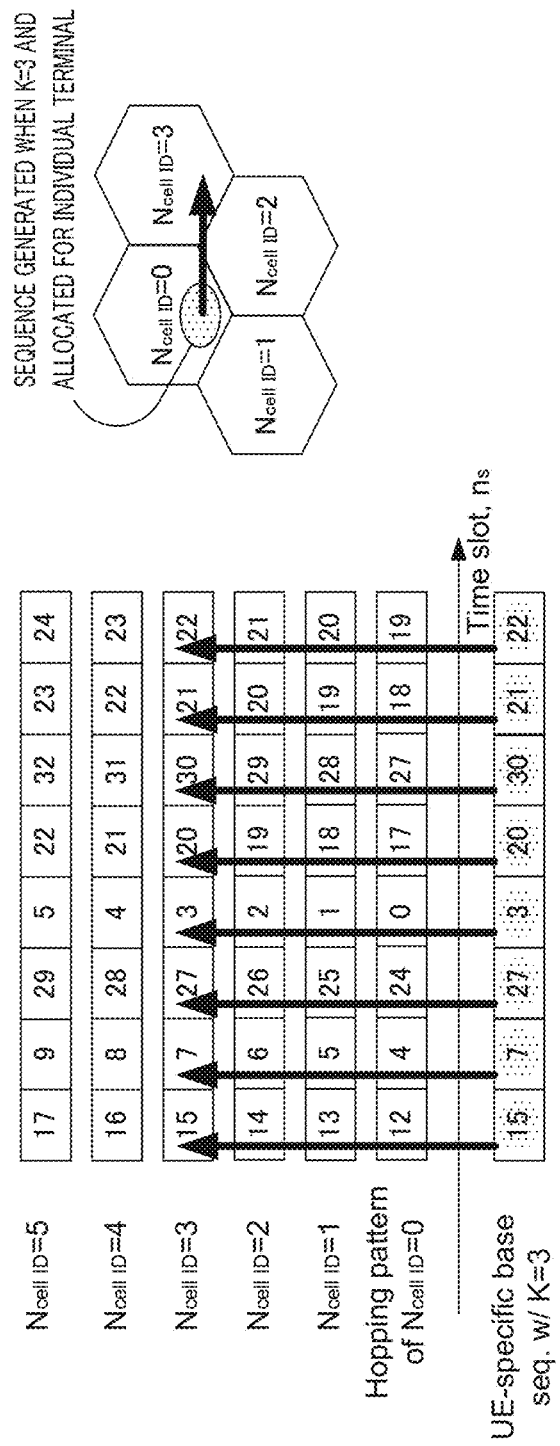
FIG. 16 illustrates a sequence group allocated by signaling for an individual terminal in Embodiment 6.

FIG. 16 illustrates a sequence group allocated by signaling for an individual terminal in Embodiment 6.

In Embodiment 6, expressions 1 and 2 determining a cell-specific base sequence group are used to change the value of $N_{cell\ ID}$ in the expressions into the value (constant value) of new parameter K and to determine a sequence group allocated by signaling for an individual terminal. The value of new parameter K is set as $N_{cell\ ID}$ of a cell other than the connected cell in the same cell cluster.

FIG. 16 illustrates an example case where new parameter K is set as the value "K=3" of the cell ID of another cell ($N_{cell\ ID}=3$) in the same cell cluster when terminal apparatus 20 is located in the connected cell ($N_{cell\ ID}=0$).

In this case, a base sequence group allocated by signaling for an individual terminal is the same as a cell-specific base sequence group of other cell ($N_{cell\ ID}=3$), but does not overlap with a cell-specific base sequence group of any other cell in the same cell cluster once.

According to the communication system of Embodiment 6, a large number of base sequence groups that can be used in one cell can be secured by allocating a base sequence group by signaling for an individual terminal using new parameter K. This configuration is useful when the influence of interference with another cell is not large, for example, when a few other terminal apparatuses 20 are connected to another cell ($N_{cell\ ID}=3$).

In addition, new parameter K may also be determined in a network and may be indicated from RP 10 to terminal apparatus 20.

Embodiment 7

Embodiment 7 solves a problem of securing a large number of base sequence groups that can be used by terminal apparatus 20 in a connected cell when the influence of interference with a cell in another cell cluster is not significantly large.

Figure 17:
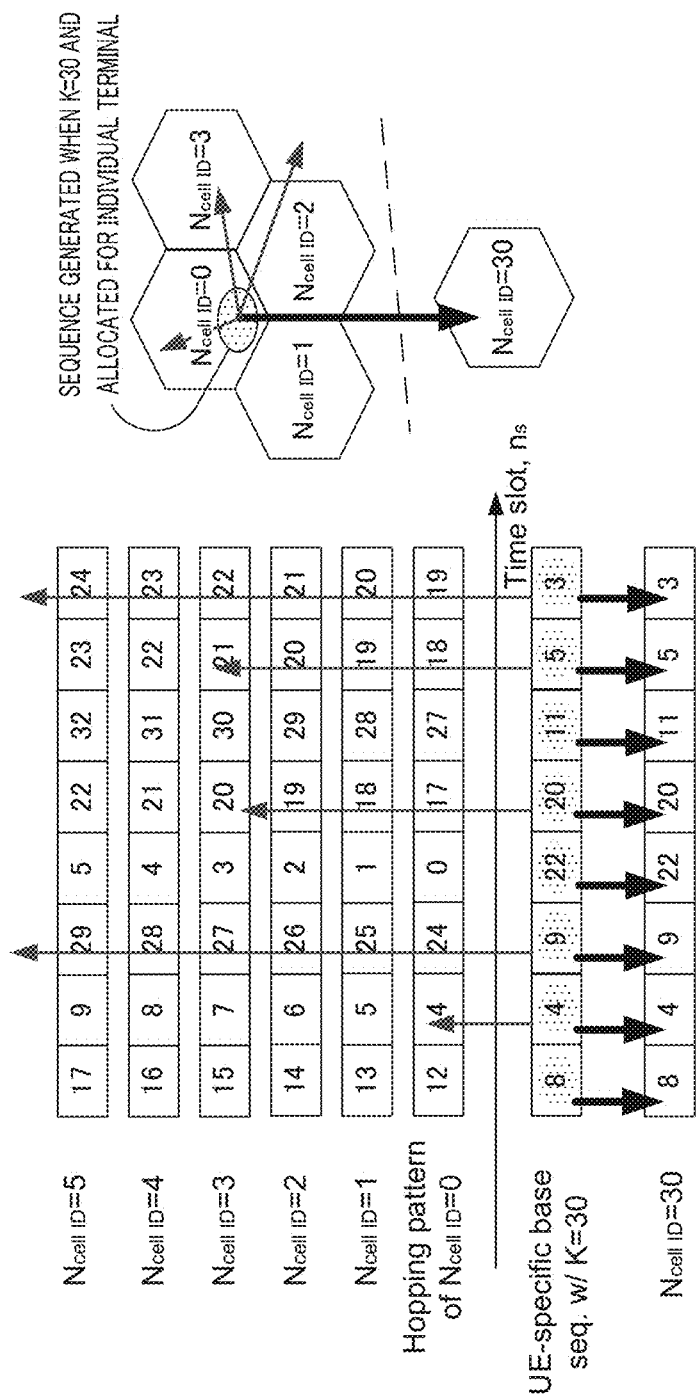
FIG. 17 illustrates a sequence group allocated by signaling for an individual terminal in Embodiment 7.

FIG. 17 illustrates a sequence group allocated by signaling for an individual terminal in Embodiment 7.

In Embodiment 7, expressions 1 and 2 determining a cell-specific base sequence group are used to change the value of $N_{cell\ ID}$ in the expressions into the value (constant value) of new parameter K and to determine a sequence group allocated by signaling for an individual terminal. The value of new parameter K is set as $N_{cell\ ID}$ of a cell in another cell cluster.

FIG. 17 illustrates an example case where new parameter K is set as the value "K=30" of the cell ID of a cell ($N_{cell\ ID}=30$) in another cell cluster when terminal apparatus 20 is located in the connected cell ($N_{cell\ ID}=0$).

In this case, a base sequence group allocated by signaling for an individual terminal always overlaps with a cell-specific base sequence group of one cell in the other cell cluster, but randomly overlaps with a cell-specific base sequence group of each cell in the same cell cluster.

According to the communication system of Embodiment 7, a large number of base sequence groups that can be used in one cell can be secured by allocating a base sequence group by signaling for an individual terminal using new parameter K. This configuration is useful when it is known that the influence of interference with a specific cell in another cell cluster hardly occurs, for example, when a specific cell in another cell cluster is significantly distant.

In addition, new parameter K may also be determined in a network and may be indicated from RP 10 to terminal apparatus 20.

In the above, each embodiment of the present invention has been explained.

In each above-described embodiment, a specific example of a base sequence group allocated by signaling for an individual terminal has been explained. However, the present invention is not limited to the expressions or the data tables illustrated in each embodiment. The present invention includes all allocation patterns of sequence groups satisfying the following conditions 1 to 3.

1. The base sequence group is always different from a base sequence group allocated to a connected cell of a terminal apparatus.

2. The sequence group has a hopping pattern different from that of a base sequence group allocated to a cell belonging to another cell cluster.

3. Overlapping with a base sequence group allocated to another cell in the same cell cluster does not concentrate in a single cell.

Although the above-described embodiments have been explained using a DMRS as a target reference signal, an SRS or other reference signals can also be used as a target reference signal. Moreover, the antenna explained in the above-described embodiments can be replaced with an antenna port.

Although each above-described embodiment has been explained using a case where the present invention is implemented with hardware, as an example, the present invention can be implemented with software in cooperation with hardware.

Furthermore, each function block employed in the explanation of each above-described embodiment may typically be implemented as an LSI constituted by an integrated circuit. These function blocks may be individual chips or partially or totally contained on a single chip. The term "LSI" is adopted herein but this may also be referred to as "IC," "system LSI," "super LSI," or "ultra LSI," depending on the differing extents of integration.

The method of implementing integrated circuit is not limited to LSI, and implementation by means of dedicated circuitry or a general-purpose processor may also be possible. After LSI manufacture, utilization of a field programmable gate array (FPGA) or a reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2012-016414, filed on Jan. 30, 2012, including the specification, drawings and abstract, is incorporated herein by reference in its entirety.

INDUSTRIAL APPLICABILITY

The present invention is applicable to a cellular portable telephone, a base station therefor, and a communication method therefor.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCE SIGNS LIST

10 RP (Base station)
11 Transmission processing section
12 Reference signal extraction section
13 Reception signal processing section
101 Antenna
102 Radio transmission section
104 Radio reception section
111 Channel estimation section
112 Control section
20 Terminal apparatus
22 Sequence determination section
23 Transmission processing section
24 Reception processing section
201 Antenna
202 Control section
203 DMRS generation section
212 Radio transmission section
213 Radio reception section

The invention claimed is:

1. A radio communication terminal comprising:
a controller, which,
in response to receiving signaling specific to the radio communication terminal, determines a base sequence group based on the received signaling; and
in response to not receiving signaling specific to the radio communication terminal, determines a base sequence group which is allocated to a cell that contains the radio communication terminal;

wherein the controller, in operation, generates a sounding reference signal (SRS) using the determined base sequence group; and
a transmitter, which is coupled to the controller and which, in operation, transmits the generated SRS;
wherein the base sequence group determined based on the signaling specific to the radio communication terminal is based on a cell-specific sequence group number, to which a variable offset is added, wherein the variable offset temporally varies to take different values in different time slots in one cycle period.

2. The radio communication terminal according to claim 1, wherein the signaling specific to the radio communication terminal is received before the transmitter transmits the generated SRS.

3. The radio communication terminal according to claim 1, wherein the controller, in response to receiving new signaling specific to the radio communication terminal, updates the determined base sequence group based on the new signaling and generates another SRS using the updated base sequence group.

4. The radio communication terminal according to claim 1, wherein the base sequence group determined based on the signaling specific to the radio communication terminal does not overlap with the base sequence group allocated to the cell that contains the radio communication terminal due to the variable offset.

5. The radio communication terminal according to claim 1, wherein the signaling specific to the radio communication terminal includes 9 bits of a cell ID.

6. A radio communication terminal comprising:
a receiver, which, in operation, receives an instruction specifically signaled to the radio communication terminal by a Radio Resource Control (RRC) layer, the instruction including a parameter of a sequence number;
a controller, which is coupled to the receiver and which, in operation, configures a sequence number based on the received instruction, ignoring a sequence number allocated to a cell that contains the radio communication terminal, and generates a Sounding Reference Signal (SRS) of a sequence group corresponding to the configured sequence number; and
a transmitter, which is coupled to the controller and which, in operation, transmits the generated SRS,
wherein the sequence group corresponding to the configured sequence number is based on a cell-specific sequence group number, to which a variable offset is added, wherein the variable offset temporally varies to take different values in different time slots in one cycle period.

7. The radio communication terminal according to claim 6, wherein a number of times sequence numbers respectively allocated to neighboring cells overlap with the configured sequence number of the radio communication terminal in one cycle period of cyclically repeated sequence number allocation is not concentrated in any one of the neighboring cells.

8. The radio communication terminal according to claim 7, wherein a difference among the numbers of times sequence numbers respectively allocated to neighboring cells overlap with the configured sequence number of the radio communication terminal in one cycle period is at most three.

9. A method performed by a radio communication terminal, the method comprising:

in response to receiving signaling specific to the radio communication terminal, determining a base sequence group based on the received signaling;
in response to not receiving signaling specific to the radio communication terminal, determining a base sequence group which is allocated to a cell that contains the radio communication terminal;
generating a sounding reference signal (SRS) using the determined base sequence group; and
transmitting the generated SRS,
wherein the base sequence group determined based on the signaling specific to the radio communication terminal is based on a cell-specific sequence group number, to which a variable offset is added, wherein the variable offset temporally varies to take different values in different time slots in one cycle period.

10. The method according to claim 9, wherein the signaling specific to the radio communication terminal is received before the generated SRS is transmitted.

11. The method according to claim 9, comprising:
in response to receiving new signaling specific to the radio communication terminal, updating the determined base sequence group based on the new signaling and generating another SRS using the updated base sequence group.

12. The method according to claim 9, wherein the base sequence group determined based on the signaling specific to the radio communication terminal does not overlap with the base sequence group allocated to the cell that contains the radio communication terminal due to the variable offset.

13. The method according to claim 9, wherein the signaling specific to the radio communication terminal includes 9 bits of a cell ID.

14. A method performed by a radio communication terminal, the method comprising:
receiving an instruction specifically signaled to the radio communication terminal by a Radio Resource Control (RRC) layer, the instruction including a parameter of a sequence number;
configuring a sequence number based on the received instruction, ignoring a sequence number allocated to a cell that contains the radio communication terminal;
generating a Sounding Reference Signal (SRS) of a sequence group corresponding to the configured sequence number; and
transmitting the generated SRS,
wherein the sequence group corresponding to the configured sequence number is based on a cell-specific sequence group number, to which a variable offset is added, wherein the variable offset temporally varies to take different values in different time slots in one cycle period.

15. The method according to claim 14,
wherein a number of times sequence numbers respectively allocated to neighboring cells overlap with the configured sequence number of the radio communication terminal in one cycle period of cyclically repeated sequence number allocation is not concentrated in any one of the neighboring cells.

16. The method according to claim 15, wherein a difference among the numbers of times sequence numbers respectively allocated to neighboring cells overlap with the configured sequence number of the radio communication terminal in one cycle period is at most three.

17. The radio communication terminal according to claim 6, wherein,
the sequence number is represented by an integer modulo $N_{SG}$, and
the variable offset satisfies equations (1) to (3) below:

$$F(n_s) \bmod N_{SG} \neq 0 \quad (1)$$

$$Pr[F(n_s)=x] \leq 3/X \quad (2)$$

$$X \geq 0.5 \times N_{TS} \quad (3)$$

where $n_s$ is a time slot;
$F(n_s)$ is a value of the variable offset in the time slot $n_s$;
$N_{SG}$ is a number of sequence groups, or a number of cells belonging to one cell cluster;
Pr represents a probability to satisfy an expression in brackets;
X is an element number of a set of all the values taken as value x of the variable offset; and
$N_{TS}$ is a number of time slots in one cycle period.

18. The radio communication terminal according to claim 17, wherein,
the variable offset $F(n_s)$ is represented by equation (4) below:

$$F(n_s) = \lambda \times ns + z \quad (4)$$

where λ and z are integers other than zero and satisfying the equations (1) to (3).

19. The method according to claim 14, wherein,
the sequence number is represented by an integer modulo $N_{SG}$, and
the variable offset satisfies equations (1) to (3) below:

$$F(n_s) \bmod N_{SG} \neq 0 \quad (1)$$

$$Pr[F(n_s)=x] \leq 3/X \quad (2)$$

$$X \geq 0.5 \times N_{TS} \quad (3)$$

where $n_s$ is a time slot;
$F(n_s)$ is a value of the variable offset in the time slot $n_s$;
$N_{SG}$ is a number of sequence groups, or a number of cells belonging to one cell cluster;
Pr represents a probability to satisfy an expression in brackets;
X is an element number of a set of all the values taken as value x of the variable offset; and
$N_T$s is a number of time slots in one cycle period.

20. The method according to claim 19, wherein,
the variable offset $F(n_s)$ is represented by equation (4) below:

$$F(n_s) = \lambda \times ns + z \quad (4)$$

where λ and z are integers other than zero and satisfying the equations (1) to (3).

* * * * *